United States Patent
Yoon et al.

(10) Patent No.: US 10,142,456 B2
(45) Date of Patent: Nov. 27, 2018

(54) USER EQUIPMENT TO PERSONALIZE USE OF SERVICE AND OPERATING METHOD THEREOF

(71) Applicant: SAMSUNG ELECTRONICS CO., LTD., Suwon-si (KR)

(72) Inventors: Taeung Yoon, Incheon (KR); Keon Yong Ma, Daegu (KR); SeongHoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/440,096

(22) Filed: Feb. 23, 2017

(65) Prior Publication Data
US 2018/0084102 A1 Mar. 22, 2018

(30) Foreign Application Priority Data
Sep. 19, 2016 (KR) .................. 10-2016-0119558

(51) Int. Cl.
*H04B 1/38* (2015.01)
*H04M 1/725* (2006.01)
*H04M 3/38* (2006.01)
*H04W 48/02* (2009.01)

(52) U.S. Cl.
CPC ....... *H04M 1/72563* (2013.01); *H04M 3/382* (2013.01); *H04W 48/02* (2013.01)

(58) Field of Classification Search
CPC .................................. H04W 1/38; H04B 1/38
See application file for complete search history.

(56) References Cited

U.S. PATENT DOCUMENTS

| | | | |
|---|---|---|---|
| 8,126,455 B2 | 2/2012 | Hu et al. | |
| 8,223,971 B2 | 7/2012 | Ahn | |
| 9,312,901 B2 | 4/2016 | Park et al. | |
| 2013/0273972 A1* | 10/2013 | Korkiakoski | H04L 67/306 455/558 |
| 2014/0018131 A1* | 1/2014 | Yao | H04W 8/183 455/558 |
| 2015/0105048 A1 | 4/2015 | El Mghazli et al. | |

FOREIGN PATENT DOCUMENTS

| | | |
|---|---|---|
| JP | 2009-159573 A | 7/2009 |
| JP | 2012-119965 A | 6/2012 |
| KR | 10-0628048 B1 | 9/2006 |
| KR | 10-0701040 B1 | 3/2007 |
| KR | 10-0765543 B1 | 10/2007 |

* cited by examiner

*Primary Examiner* — Christopher M Brandt
(74) *Attorney, Agent, or Firm* — Sughrue Mion, PLLC

(57) ABSTRACT

An operating method of user equipment configured to personalize use of service is provided. The user equipment includes a storage that stores personalization management information including pieces of personalization information and pieces of service operator information corresponding to each of the pieces of personalization information. The operating method includes accessing the storage to read the personalization management information and, from the personalization management information, detecting personalization information and service operator information matched to reference information registered in the user equipment, and determining whether a user is able to use the service, by using user information that is received from the outside and a result of the detection.

20 Claims, 21 Drawing Sheets

FIG. 5

Tabel_1

| | | | |
|---|---|---|---|
| PI_1 → | TAG_PERSO_1 | Network personalization (NP) | ⎫ |
| PI_2 → | TAG_PERSO_2 | Network subset personalization (NSP) | ⎬ Defined in 3GPP |
| PI_3 → | TAG_PERSO_3 | Service operator personalization (SOP) | |
| PI_4 → | TAG_PERSO_4 | Corporate personalization (CP) | |
| PI_5 → | TAG_PERSO_5 | SIM/USIM personalization (S/UP) | ⎭ |
| ⋮ | ⋮ | ⋮ | |
| PI_N → | TAG_PERSO_(N) | Optional personalization (OP) | |

FIG. 6

Tabel_2

| | | |
|---|---|---|
| SOP_1 → | TAG_OP_1 | Operator #1 |
| SOP_2 → | TAG_OP_2 | Operator #2 |
| ⋮ | ⋮ | ⋮ |
| SOP_M → | TAG_OP_M | Operator #M |

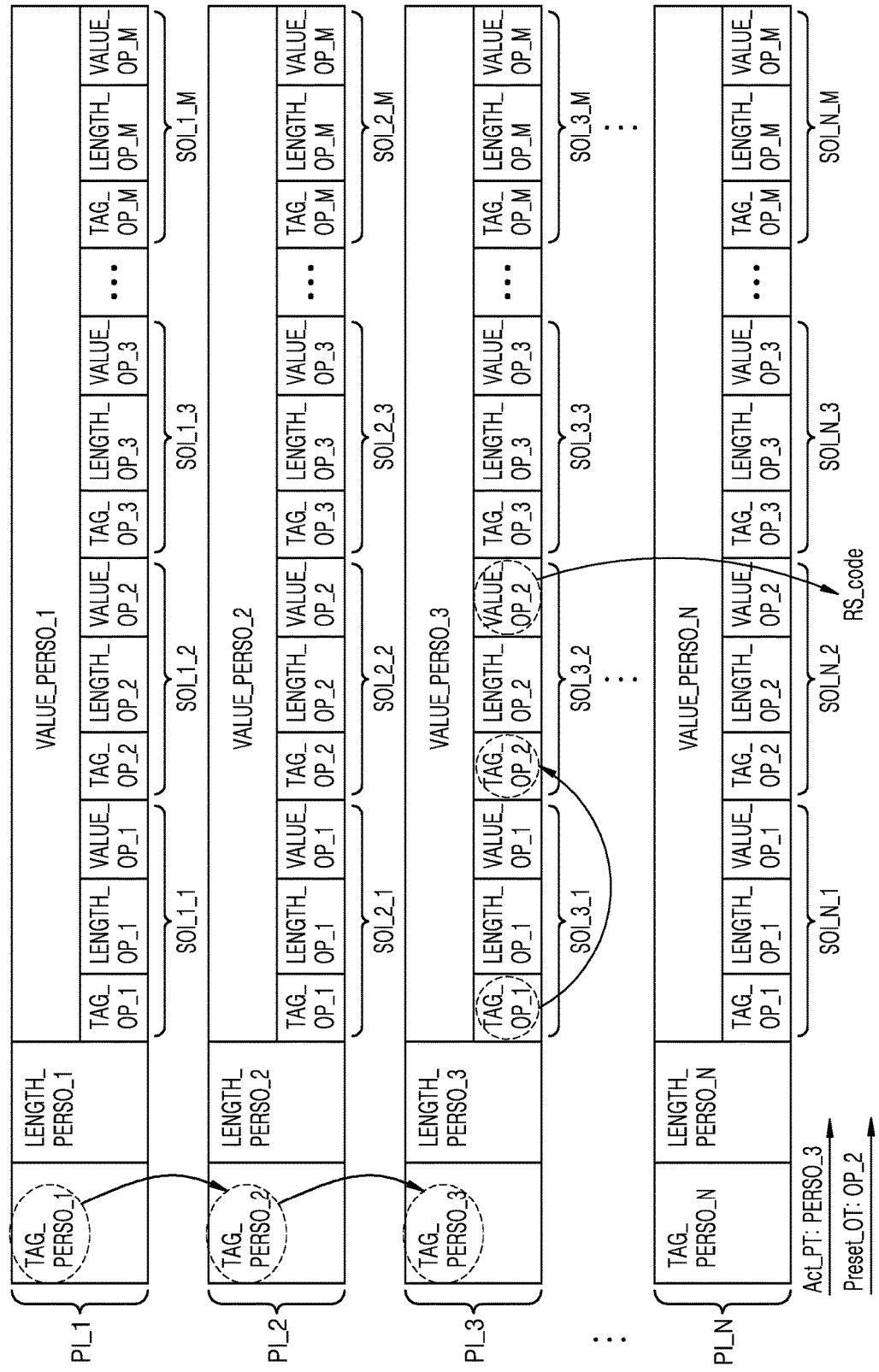

USER EQUIPMENT TO PERSONALIZE USE OF SERVICE AND OPERATING METHOD THEREOF

CROSS-REFERENCE TO RELATED APPLICATION

This application claims priority from Korean Patent Application No. 10-2016-0119558, filed on Sep. 19, 2016, in the Korean Intellectual Property Office, the disclosure of which is incorporated by reference herein in its entirety.

BACKGROUND

Methods, apparatuses, and articles of manufacture consistent with the present disclosure relate to user equipment, and more particularly, to user equipment configured to personalize use of service and an operating method thereof.

Personalization of user equipment refers to restricting the use of user equipment by using a code stored in the user equipment, whereby, when a personalization category is activated, the user may normally use the service provided by a service operator only when a code value extracted from a smart card of the user corresponds to a code value stored in the user equipment. Personalization information of the user equipment, which is required by each service operator, may be different, and thus, when the service operator is changed, information associated with the personalization of the user equipment has to be changed.

SUMMARY

It is an aspect to provide user equipment which may efficiently improve use of service by using personalization management information including a plurality of pieces of personalization information and a plurality of pieces of service operator information corresponding to each of the plurality of pieces of personalization information, and an operating method thereof.

According to an aspect of an example embodiment, there is provided an operating method of user equipment configured to personalize use of service, wherein the user equipment includes a storage configured to store personalization management information including a plurality of pieces of personalization information and a plurality of pieces of service operator information corresponding to each of the plurality of pieces of personalization information, the operating method including accessing the storage to read the personalization management information and, from the personalization management information, detecting personalization information and service operator information matched to reference information registered in the user equipment, and determining whether a user is able to use the service, by using user information that is received from the outside and a result of the detection.

According to another aspect of an example embodiment, there is provided user equipment for using a service, the user equipment including a storage configured to store personalization management information including a plurality of pieces of personalization information and a plurality of pieces of service operator information corresponding to each of the plurality of pieces of personalization information, a smart card configured to store user information about a user, and a personalization module configured to detect personalization information and service operator information matched to an activated personalization category from among a plurality of personalization categories and a service operator, respectively, from the personalization management information, and determine whether the user is able to use the service, by using a result of the detection and the user information.

According to another aspect of an example embodiment, there is provided user equipment for using a service User equipment for using a service, the user equipment comprising a storage configured to store personalization management information comprising a plurality of pieces of personalization information stored sequentially in the storage, and a plurality of pieces of service operator information stored sequentially in the storage corresponding to each of the plurality of pieces of personalization information; a smart card configured to store user information about a user; and a personalization module configured to receive an activated personalization category and a pre-set service operator, read the personalization management information from the storage and sequentially search through the personalization management information to detect a match between a piece of personalization information and the activated personalization category, and search through the personalization management information to detect a match between the pre-set service operator and a piece of the service operator information, and determine whether the user is able to use the service, by using a result of the detection and the user information.

BRIEF DESCRIPTION OF THE DRAWINGS

Example embodiments of the inventive concept will be more clearly understood from the following detailed description taken in conjunction with the accompanying drawings in which:

FIG. 5 is a table showing a relationship between a personalization tag and a personalization category of personalization information, according to an example embodiment;

FIG. 6 is a table showing a relationship between an operator tag of service operator information and a service operator, according to an example embodiment;

FIGS. 7A through 7C are diagrams for describing a personalization operation of user equipment, according to an example embodiment;

DETAILED DESCRIPTION

Hereinafter, example embodiments of the present inventive concept will be described in detail by referring to the accompanying drawings.

Figure 1:
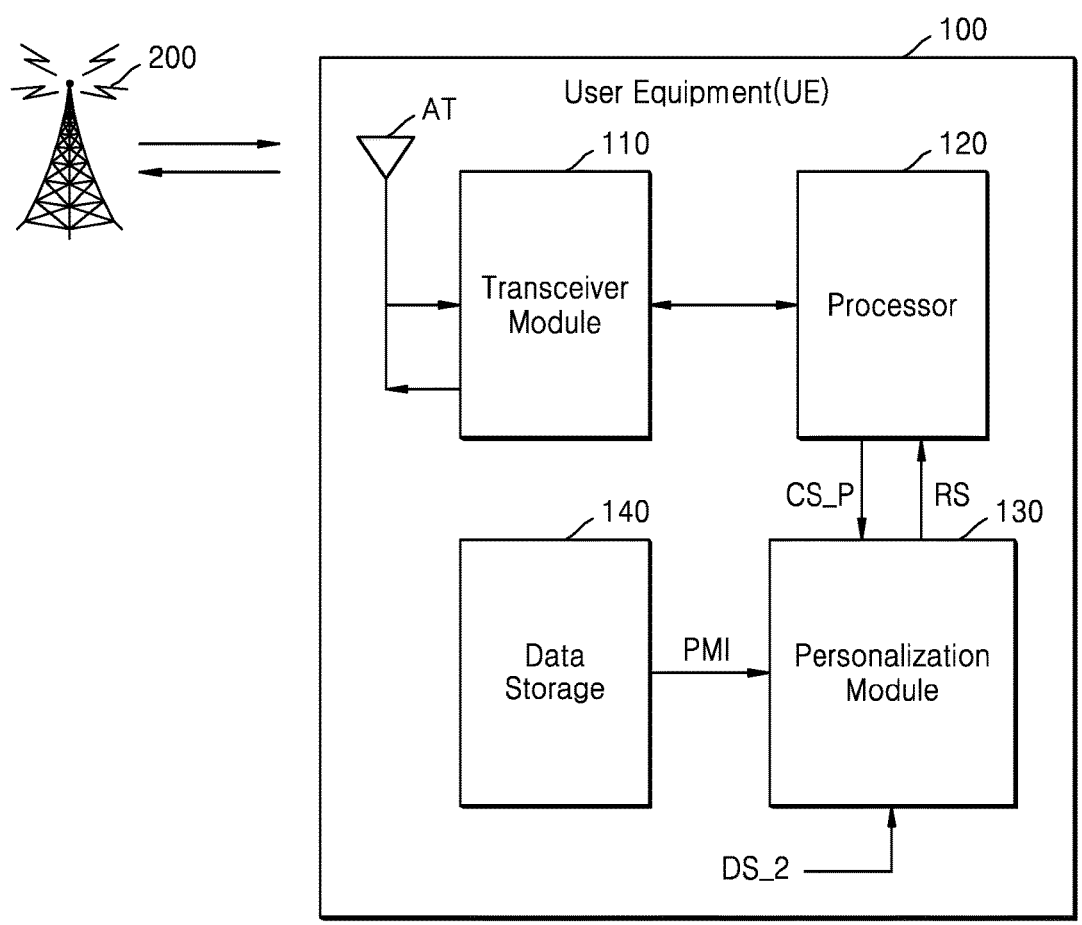
FIG. 1 is a block diagram of an example of a wireless communication system configured to perform a personalization operation according to an example embodiment.

FIG. 1 is a block diagram of an example of a wireless communication system configured to perform a personalization operation according to an example embodiment.

As illustrated in FIG. 1, a service operator may provide a service, such as communication via a downlink channel and an uplink channel, to user equipment (UE) 100, by using a base station 200. Here, the UE 100 for using the service may perform a personalization operation so that only a user configured to use the service may use the service provided by the service operator via the UE 100, and a user not configured to use the service may not normally use the service provided by the service operator via the UE 100. Whether a user that aims to use the service is able to use the service may be determined via the personalization operation of the UE 100. For example, the determination may be performed by comparing information about the user stored in a smart card of the user with information stored in the UE 100.

The UE 100 may be stationary or non-stationary, and may include various devices which may communicate with and exchange data and/or control information with the base station 200. For example, the UE 100 may be referred to as terminal equipment, a mobile station (MS), a mobile terminal (MT), a user terminal (UT), a subscriber station (SS), a wireless device, a handheld device, etc. The base station (BS) 200 may generally refer to a fixed station configured to communicate with a UE and/or another base station. The BS 200 may communicate with and exchange data and control information with UEs and/or other base stations. For example, the BS 200 may also be referred to as Node B, evolved-Node B (eNB), a base transceiver system (BTS), an access point (AP), etc. A wireless communication network may support communication among a plurality of users sharing available network resources. A UMTS terrestrial radio access network (UTRAN), one of such wireless communication networks, is a radio access network (RAN), defined by a universal mobile telecommunications system (UMTS), one of the 3$^{rd}$ generation mobile communication technologies that are standardized by the 3$^{rd}$ generation partnership project (3GPP). UMTS supports various air interface standards, such as wideband-code division multiple access (W-CDMA), time division-code division multiple access (TD-CDMA), and time division-synchronous code division multiple access (TD_SCDMA).

The UE 100 may include an antenna AT, a transceiver module 110, a processor 120, a personalization module 130, and a data storage 140. Each of the components included in the UE 100 may be a hardware block including an analog circuit and/or a digital circuit, or a software block including a plurality of instructions executed by a processor, etc.

The transceiver module 110 may receive radio frequency (RF) signals from the base station 200 via the antenna AT, and may transmit signals processed in the UE 100 to the base station 200 as the RF signals via the antenna AT. The UE 100 may use the service provided by the service operator via the transceiver module 110.

The processor 120 may control general operations of the UE 100 so that the user may use the service provided by the service operator. The processor 120 may be a microprocessor or a central processing unit (CPU). When the UE 100 is booted, for example, when the UE 100 is put in a state of "on" from a state of "off," the processor 120 may control a start of the personalization operation. In detail, when the UE 100 is booted, the processor 120 may control an operation of the personalization module 130 by applying a control signal CS_P to the personalization module 130. Further, the processor 120 may set information indicating a personalization category which is currently activated from among a plurality of personalization categories and a service operator providing a service via the UE 100. The data storage 140 may store personalization management information. The personalization management information may include a plurality of pieces of personalization information and a plurality of pieces of service operator information corresponding to each of the plurality of pieces of personalization information. Also, the personalization management information may have various data formats. Detailed descriptions regarding this aspect will be given later.

The personalization module 130 according to an example embodiment may receive the information about the currently activated personalization category and the service operator providing the service from the processor 120. The personalization module 130 may detect the personalization information matched to the activated personalization category from among the plurality of personalization categories and the service operator information matched to the service operator providing the service, from the personalization management information (PMI) stored in the data storage 140. The personalization module 130 may extract a first data set Data Set_1 (DS_1) including at least one reference source code from the personalization management information, as a result of the detection. Also, the personalization module 130 may receive a second data set DS_2 including at least one user source code corresponding to the activated personalization category from the outside, and the second data set DS_2 may correspond to information about the current user. The personalization module 130 may generate at least one reference code by using the first data set DS_1 and generate at least one user code by using the second data set DS_2. The personalization module 130 may compare the reference code with the user code and determine whether the current user may use the service based on a result of the comparison.

The processor 120 may receive a result signal RS from the personalization module 130 and when it is determined that the current user may use the service with reference to the result signal RS, may control the UE 100 so that the current user may normally use the service. Also, when it is determined that the current user may not use the service with reference to the result signal RS, the processor 120 may control the UE 100 so that the current user may not use the service. However, regardless of whether the current user may or may not use the service, the processor 120 may control the UE 100 such that the current user may use an emergency call service. As described above, the UE 100 may perform the personalization operation so that only the user configured to use the service may use the service, by using the personalization management information.

Figure 2:
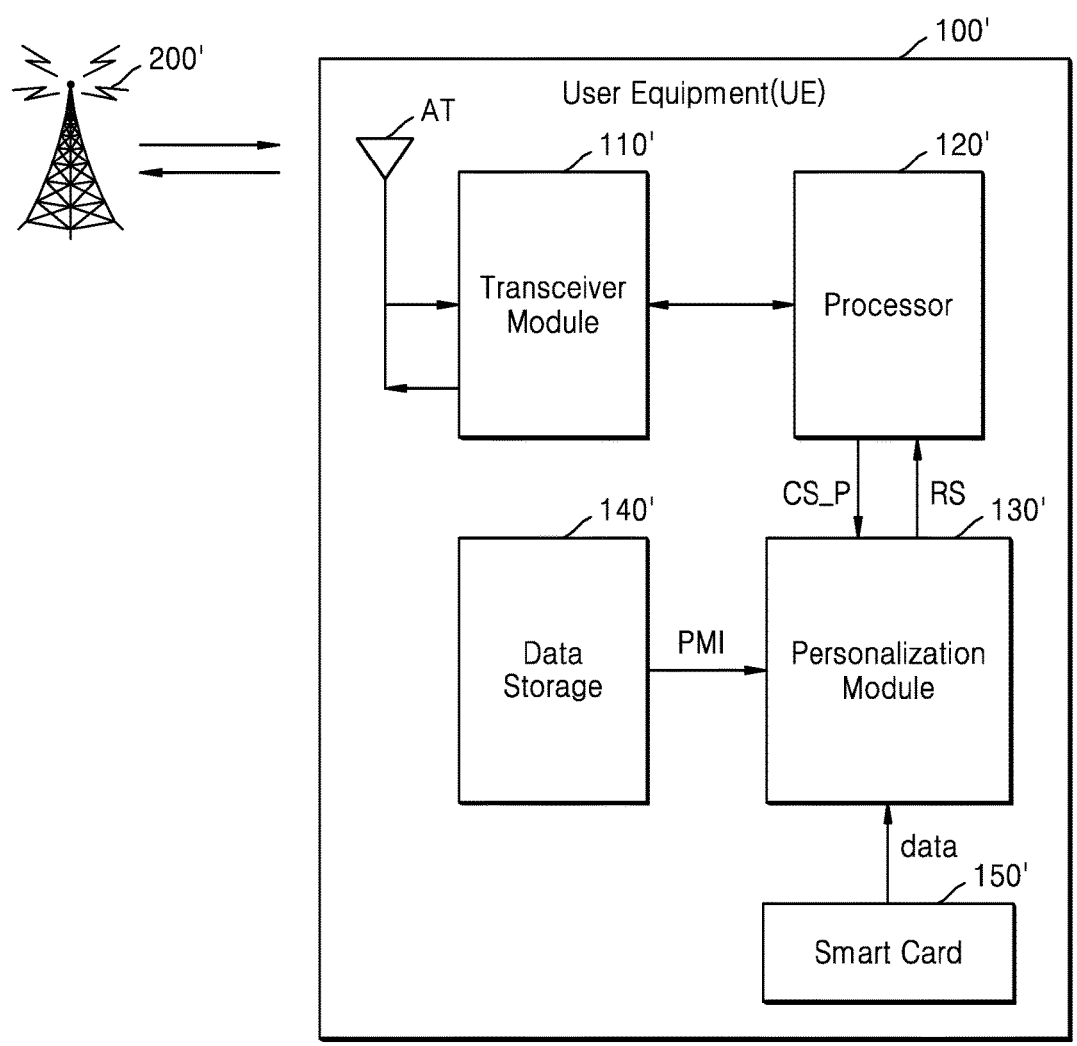
FIG. 2 is a block diagram of an example of a wireless communication system configured to perform a personalization operation according to another example embodiment.

FIG. 2 is a block diagram of an example of a wireless communication system configured to perform a personalization operation according to another example embodiment.

Referring to FIG. 2, compared to FIG. 1, UE 100' may further include a smart card 150'. Other components of the UE 100' may be the same as those of the UE 100 illustrated in FIG. 1. The smart card 150' may be at least one of a subscriber identity module (SIM), a universal SIM (USIM), and a user identity module (UIM). However, it is only an example embodiment, and the smart card 150' may include various other modules. The smart card 150' may be inserted into or removed from the UE 100', and when the smart card 150' is inserted into the UE 100', a processor 120' may control an operation of a personalization module 130'. The personalization module 130' may receive data from the smart card 150', and extract a second data set DS_2 from the data corresponding to user information of a current user from the smart card 150'. According to an example embodiment, a user code necessary to perform the personalization operation may vary according to a currently activated personalization category, and thus, a user source code necessary to generate the user code may vary according to the activated personalization category. The personalization module 130' may extract the second data set DS_2 including at least one user source code necessary to generate the user code, based on the currently activated personalization category. The personalization module 130' may determine whether the current user may use the service by using a first data set DS_1 extracted from personalization management information of a data storage 140' and the second data set DS_2 extracted from the smart card 150'.

Figure 3:
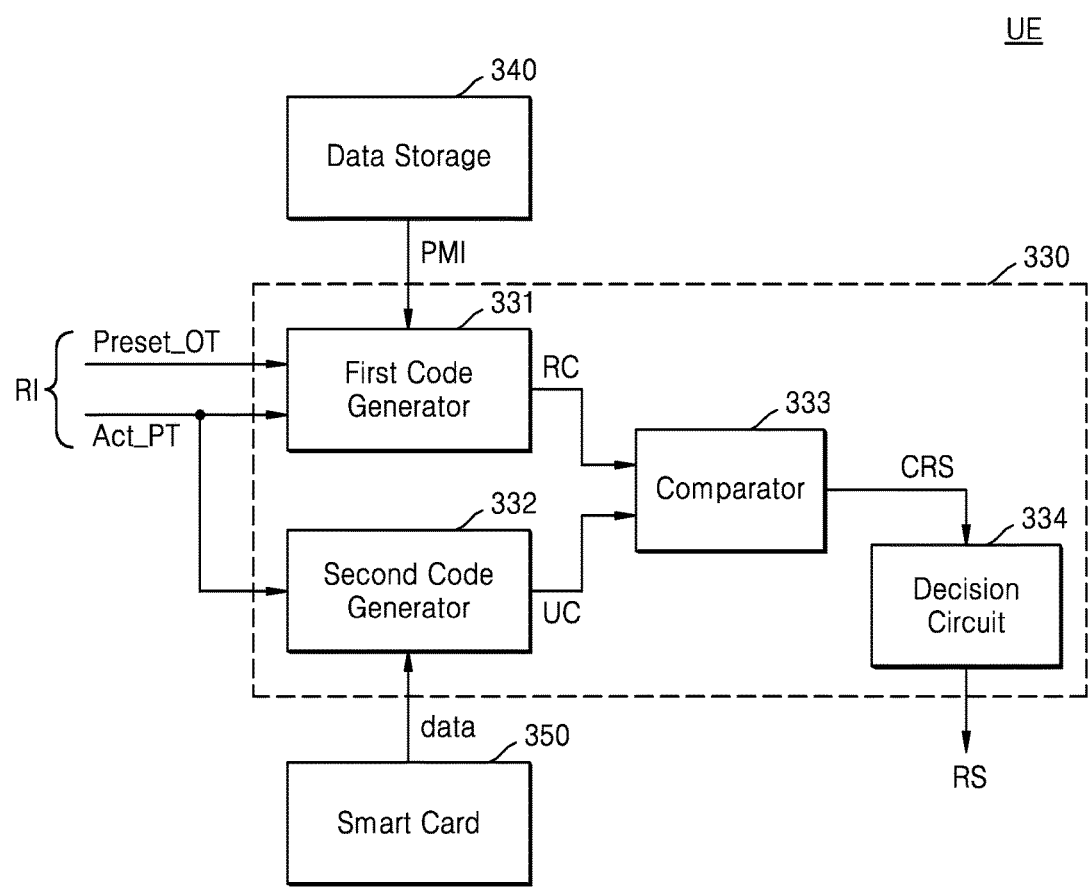
FIG. 3 is a detailed block diagram of a personalization module of user equipment according to an example embodiment.

FIG. 3 is a detailed block diagram of a personalization module 330 of a UE according to an example embodiment.

Referring to FIG. 3, the personalization module 330 may include a first code generator 331, a second code generator 332, a comparator 333, and a decision circuit 334. The first code generator 331 may receive first information Act_PT indicating an activated personalization category and second information Preset_OT indicating a pre-set service operator from the processor 120 of FIG. 1. The first information Act_PT and the second information Preset_OT may be reference information RI pre-registered in the UE. According to an example embodiment, the processor of the UE may store the reference information RI, and the reference information RI may be changed later. The first code generator 331 may extract a first data set DS_1 including at least one reference source code from personalization management information of a data storage 340, by using the first information Act_PT and the second information Preset_OT. The first code generator 331 may generate at least one reference code RC by using the first data set DS_1 and transmit the at least one generated reference code RC to the comparator 333. The second code generator 332 may receive the first information Act_PT from the processor 120 of FIG. 1. The second code generator 332 may extract a second data set DS_2 including at least one user source code necessary to generate a user code UC, from information stored in the smart card 350, by using the first information Act_PT. The second code generator 332 may generate at least one user code UC by using the second data set DS_2 and transmit the at least one generated user code UC to the comparator 333.

The comparator 333 may determine whether the received reference code RC and the user code UC correspond to each other by comparing the received reference code RC and the user code UC. The comparator 333 may compare the reference code RC with the user code UC and transmit a comparison result signal CRS to the decision circuit 334. The decision circuit 334 may determine whether a user may use a service, based on the comparison result signal CRS. According to an example embodiment, when the reference code RC and the user code UC correspond to each other, the decision circuit 334 may determine that the user may use the service, and when the reference code RC and the user code UC do not correspond to each other, the decision circuit 334 may determine that the user may not use the service. The decision circuit 334 may generate a determination result signal RS and transmit the generated determination result signal RS to the processor 120 of FIG. 1. The processor 120 of FIG. 1 may control an operation of the UE 100 based on whether the user may use the service or not.

Figure 4A:
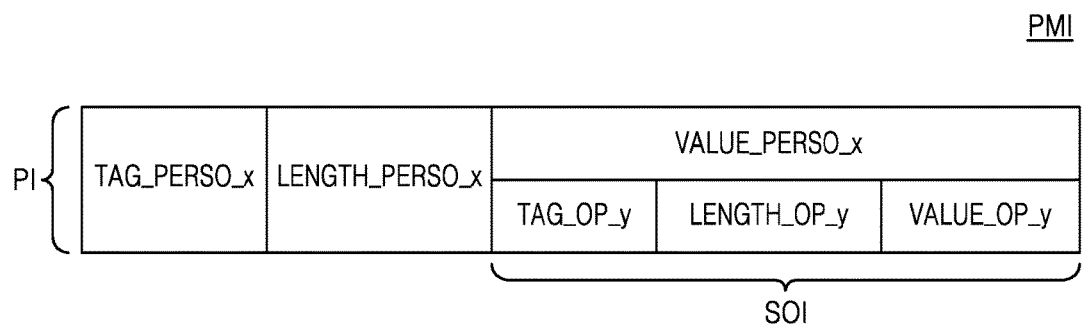
FIGS. 4A through 4C are diagrams of a data format for describing personalization management information including personalization information and service operator information corresponding thereto, according to an example embodiment.
Figure 4B:
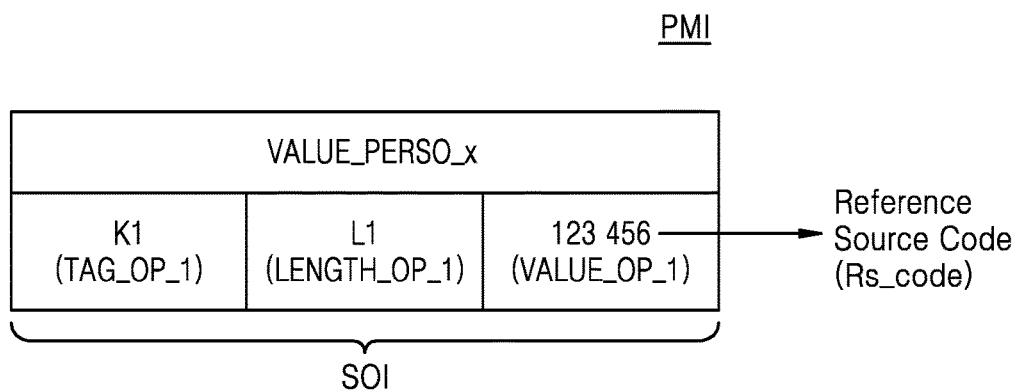
Figure 4C:
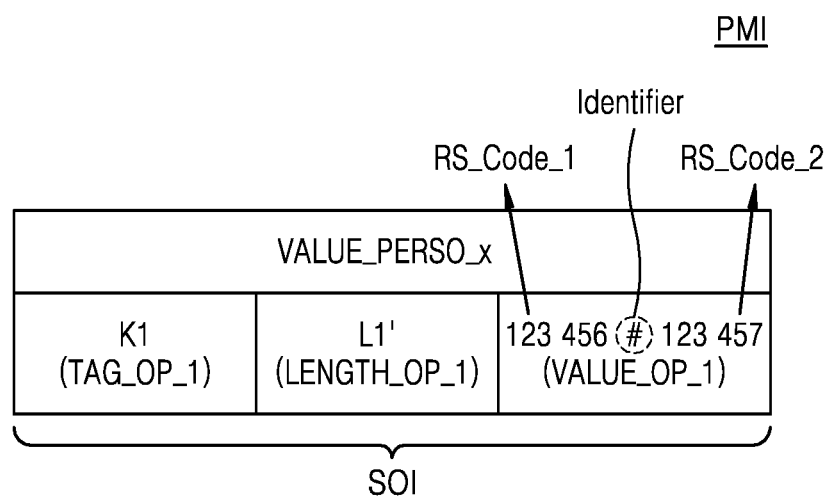

FIGS. 4A through 4C are diagrams of a data format for describing personalization management information PMI including personalization information and service operator information corresponding thereto according to an example embodiment.

Referring to FIG. 4A, the personalization management information PMI may include a plurality of pieces of personalization information PI and a plurality of pieces of service operator information SOI corresponding to each of the plurality of pieces of personalization information. Each personalization information PI may include a personalization tag TAG_PERSO_x indicating a personalization category, value data VALUE_PERSO_x including service operator information SOI corresponding to the personalization category, and length data LENGTH_PERSO_x about the personalization information PI. The length data LENGTH_PERSO_x may indicate a data length of the value data VALUE_PERSO_x, and the data length of the value data VALUE_PERSO_x may correspond to a data length of the service operator information SOI. Also, a value of the length data LENGTH_PERSO_x may vary based on the data length of the value data VALUE_PERSO_x. As such, the personalization information PI may have a data format having a form of a tag, a length, and a value (TLV).

The service operator information SOI may include an operator tag TAG_OP_y indicating a type of a service operator, operator value data VALUE_OP_y including at least one reference source code corresponding to the type of the service operator, and length data LENGTH_OP_y about the service operator information SOI. The length data LENGTH_OP_y may include information indicating a data length of the operator value data VALUE_OP_y. Also, a value of the length data LENGTH_OP_y may vary based on the data length of the operator value data VALUE_OP_y. As such, the service operator information SOI may have a data format having a form of a tag, a length, and a value (TLV). However, the data format of the personalization management information PMI illustrated in FIG. 4A is not limited thereto, and may include various data formats in which the plurality of pieces of service operator information SOI may correspond to each personalization information PI.

Referring to FIG. 4B, according to an example embodiment, the operator tag TAG_OP_1 of the service operator information SOI may have a value "K1," the operator value data VALUE_OP_1 may include a reference source code RS_code, "123 456," and the length data LENGTH_OP_1 may have a value "L1" corresponding to a length of the reference source code RS_code.

Referring to FIG. 4C, the operator value data VALUE_OP_1 of the service operator information SOI may include a greater number of reference source codes RS_code_1 and RS_code_2, compared to FIG. 4B. That is, the operator value data VALUE_OP_1 may include the first reference source code RS_code_1, "123 456," and a second reference source code RS_code_2, "123 457." Also, the operator value data VALUE_OP_1 may further include an identifier for distinguishing the first reference source code RS_code_1 and the second reference source code RS_code_2. Accordingly, the length data LENGTH_OP_1 may have a value "L1'", which is greater than the value "L1" in FIG. 4B.

FIG. 5 is a table Table_1 showing a relationship between a personalization tag and a personalization category of personalization information, according to an example embodiment.

A plurality of personalization categories may be set in UE, and the UE may perform a personalization operation based on activated personalization categories from among the plurality of personalization categories. Also, one or more personalization categories may be activated, and one or more activated personalization categories may be deactivated later, and other personalization categories may be activated. The plurality of personalization categories may include network personalization (NP), network subset personalization (NSP), service operator personalization (SOP), corporate personalization (CP), and SIM/USIM personalization (S/UP). The 3GPP recommends the personalization operation in accordance with the NP, the NSP, the SP, the CP, and the S/UP, in "3GPP technical specification 22.022," which defines personalization of UE.

Referring to FIG. 5, as illustrated in the table Table_1, the personalization management information stored in the data storage 140 of FIG. 1 may include first through fifth pieces of personalization information PI_1 through PI_5. According to an example embodiment, a first personalization tag TAG_PERSO_1 included in the first personalization information PI_1 may indicate the NP. A second personalization tag TAG_PERSO_2 included in the second personalization information PI_2 may indicate the NSP. A third personalization tag TAG_PERSO_3 included in the third personalization information PI_3 may indicate the SOP. A fourth personalization tag TAG_PERSO_4 included in the fourth personalization information PI_4 may indicate the CP. A fifth personalization tag TAG_PERSO_5 included in the fifth personalization information PI_5 may indicate the S/UP. Further, the personalization management information may further include $N^{th}$ personalization information PI_N, and an $N^{th}$ personalization tag TAG_PERSO_N of the $N^{th}$ personalization information PI_N may indicate an optional personalization (OP) category, based on which other personalization operations may be performed.

FIG. 6 is a table Table_2 showing a relationship between an operator tag of service operator information and a service operator, according to an example embodiment.

The service operator providing a service that a user aims to use may be pre-set in the UE, and the UE may perform a personalization operation based on the pre-set service operator. Also, a plurality of service operators may be pre-set, and later, the pre-set service operators may be changed to other service operators.

Referring to FIG. 6, as illustrated the table Table_2, the personalization management information stored in the data storage 140 of FIG. 1 may include the plurality of pieces of personalization information and the plurality of pieces of service operator information corresponding to each of the plurality of pieces of personalization information. For example, the personalization management information may include first through $M^{th}$ pieces of service operator information SOP_1 through SOP_M corresponding to the first personalization information PI_1 of FIG. 5. A first operator tag TAG_OP_1 of the first service operator information SOP_1 may indicate a first service operator Operator #1, a second operator tag TAG_OP_2 may indicate a second service operator Operator #2, and an $M^{th}$ operator tag TAG_OP_M may indicate an $M^{th}$ service operator Operator #M.

Figure 7A:
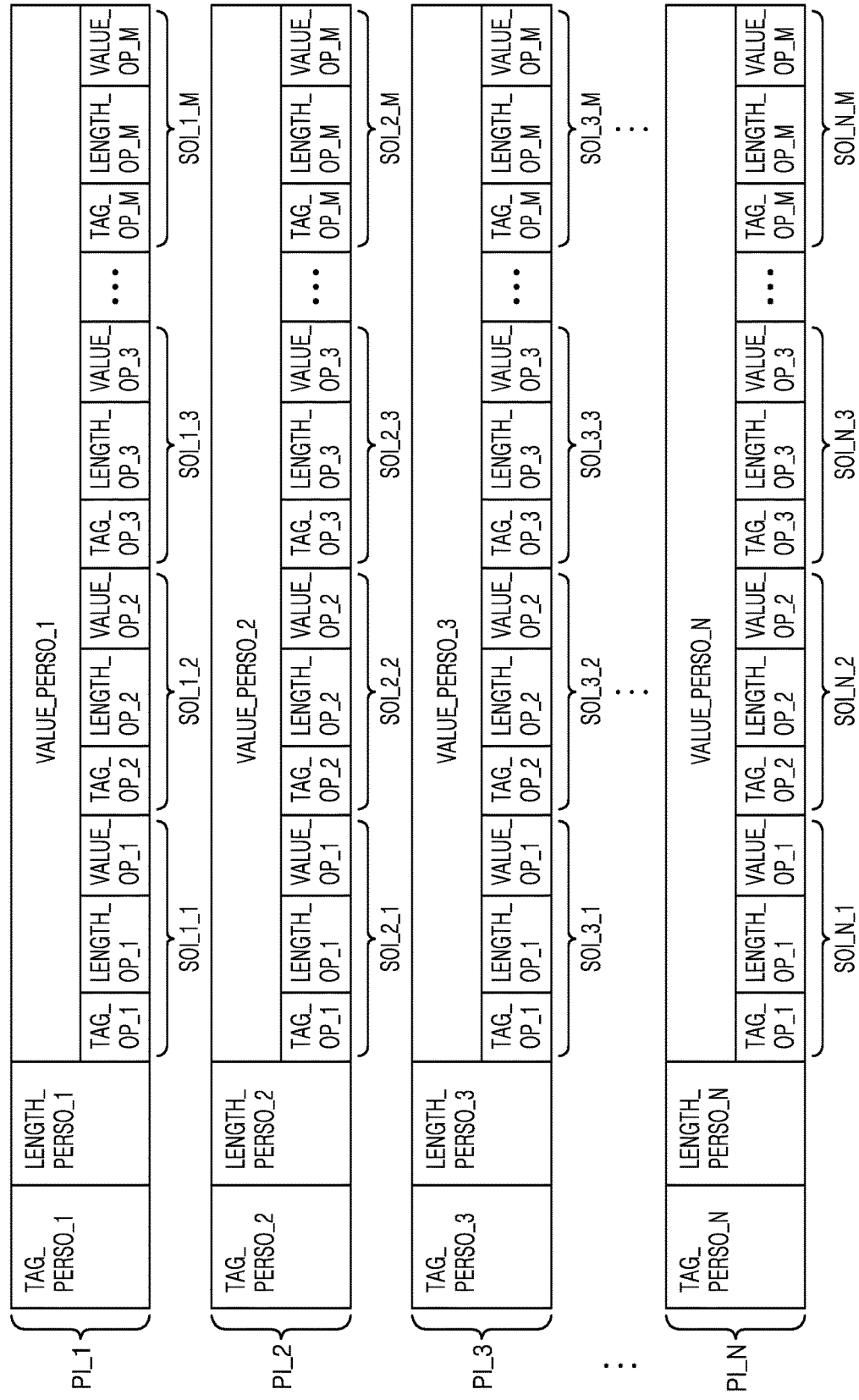
Figure 7C:
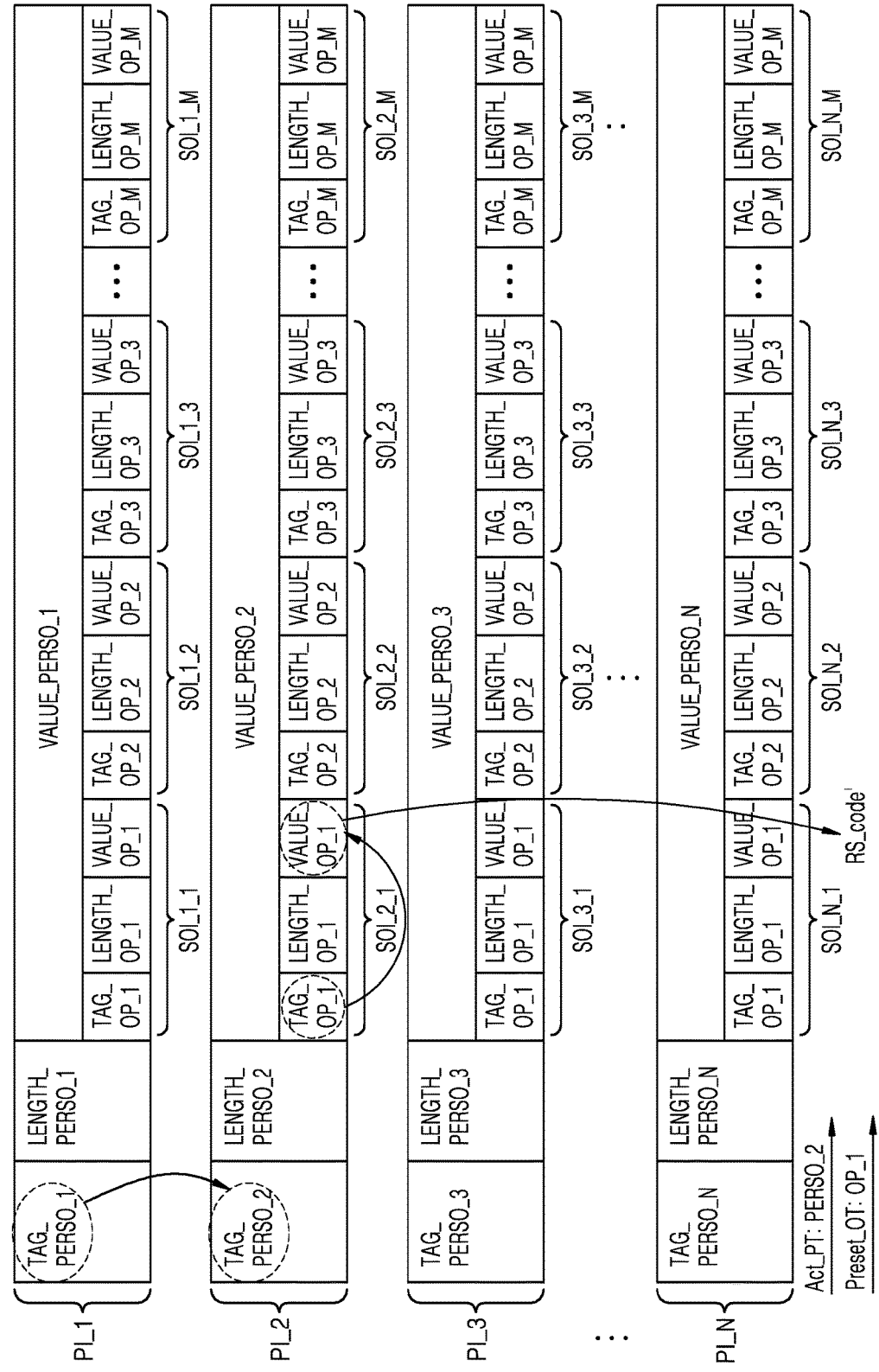

FIGS. 7A through 7C are diagrams for describing a personalization operation of UE according to an example embodiment.

Referring to FIG. 7A, the personalization management information PMI may include first through $N^{th}$ pieces of personalization information PI_1 through PI_N, and first through $M^{th}$ pieces of service operator information SOI_1_1 through SOI_1_M, SOI_2_1 through SOI_2_M, SOI_3_1 through SOI_3_M, . . . , SOI_N_1 through SOI_N_M corresponding to each of the plurality of pieces of personalization information PI_1 through PI_N. That is, first personalization information PL_1 may include first through $M^{th}$ pieces of service operator information SOI_1_1 through SOI_1_M, and the second personalization information PL_2 may include first through $M^{th}$ pieces of service operator information SOI_2_1 through SOI_2_M, etc. An $N^{th}$ personalization tag TAG_PERSO_N of the $N^{th}$ personalization information PI_N may indicate an $N^{th}$ personalization category. $N^{th}$ value data VALUE_PERSO_N of the $N^{th}$ personalization information PI_N may include the first through $M^{th}$ pieces of service operator information SOI_N_1 through SOI_N_M. Also, $N^{th}$ length data LENGTH_PERSO_N of the $N^{th}$ personalization information PI_N may indicate a length of the $N^{th}$ value data VALUE_PERSO_N.

The first through $M^{th}$ pieces of service operator information SOI_1_1 through SOI_1_M, SOI_2_1 through SOI_2_M, SOI_3_1 through SOI_3_M, . . . , SOI_N_1 through SOI_N_M corresponding to each of the plurality of pieces of personalization information PI_1 through PI_N are described with reference to FIGS. 4B through 4C, and thus, detailed descriptions thereof will be omitted. As described above, the personalization management information PMI may be sequentially stored in an area of the data storage 340 of FIG. 3. For example, the N-$1^{th}$ personalization information PI_N-1 may be stored in an area of the data storage 340, and the $N^{th}$ personalization information PI_N may be stored in a data area adjacent to the data area in which the N-$1^{th}$ personalization information PI_N-1 is stored. As a result, a distance between areas in which the N-$1^{th}$ personalization information PL_N-1 and the $N^{th}$ personalization information PL_N are stored may correspond to a value of length data LENGTH_PERSO_N-1 of the N-$1^{th}$ personalization information PL_N-1.

Also, the plurality of pieces of service operator information corresponding to each of the plurality of pieces of personalization information PI_1 through PI_N may be sequentially stored in the data storage 340. For example, the M-$1^{th}$ service operator information SOI_1_M-1 corresponding to the N-$1^{th}$ personalization information PI_N-1 may be stored in an area of the data storage 340, and the $M^{th}$ service operator information SOI_1_M may be stored in a data area adjacent to the data area in which the M-1$^{th}$ service operator information SOI M−1 is stored. As a result, a distance between areas in which the M-1$^{th}$ service operator information SOI_1_M−1 and the M$^{th}$ service operator information SOI_1_M are stored may correspond to a value of length data LENGTH_OP_M−1 of the M-1$^{th}$ service operator information SOI_1_M−1. In FIG. 7A, it is illustrated that the number of pieces of service operator information corresponding to each of the plurality of pieces of personalization information PI_1 through PI_N is M. However, it is only an example embodiment, and the number of pieces of service operator information corresponding to each of the plurality of pieces of personalization information PI_1 through PI_N may vary. For example, the number of pieces of service operator information corresponding to the personalization information PL_1 may be 6 (i.e., M=6 for PL_1), while the number of pieces of service operator information corresponding to the personalization information PL_2 may be 7 (i.e., M=7 for PL_2), etc.

Hereinafter, the operation of the personalization module 330 of FIG. 3 will be described in detail with reference to the illustration of FIG. 7A.

Referring to FIG. 3, the first code generator 331 according to an example embodiment may access the data storage 340, and detect personalization information including a personalization tag matched to an activated personalization category from the personalization management information PMI, based on the first information Act_PT. Here, the first code generator 331 may detect the personalization information based on length data of each of the pieces of personalization information. However, this is only an example and other methods may be used to perform the detection. The first code generator 331 may detect service operator information including an operator tag matched to a pre-set service operator from among a plurality of pieces of service operator information corresponding to the detected personalization information, based on the second information Preset_OT. Here, the first code generator 331 may detect the service operator information based on length data of each of the pieces of service operator information. However, this is only an example and other methods may be used to perform the detection. The first code generator 331 may extract operator value data of the detected service operator information as the first data set DS_1.

Referring to FIGS. 3 and 7B, the first code generator 331 may receive the first information Act_PT indicating that a third personalization category PERSO_3 is activated and the second information Preset_OT indicating that a second service operator OP_2 is pre-set. Also, the first code generator 331 may receive a start address corresponding to an address of the data storage 340 in which a first personalization tag TAG_PERSO_1 of the first personalization information PI_1 is stored. That is, the start address may be an address of a point of an area of the data storage 340, in which the plurality of pieces of personalization information PI_1 through PI_N are started to be stored.

With reference to the start address, first, the first code generator 331 may read the first personalization information PI_1 and match the first personalization tag TAG_PERSO_1 of the first personalization information PI_1 with the third personalization category PERSO_3. Since the first personalization tag TAG_PERSO_1 and the third personalization category PERSO_3 are mismatched, the first code generator 331 may find a location of a second personalization tag TAG_PERSO_2 of the second personalization information PI_2 based on the length data LENGTH_PERSO_1 of the first personalization information PI_1, read the second personalization tag TAG_PERSO_2, and match the second personalization tag TAG_PERSO_2 with the third personalization category PERSO_3. Since the second personalization tag TAG_PERSO_2 and the third personalization category PERSO_3 are mismatched, the first code generator 331 may find a location of a third personalization tag TAG_PERSO_3 of the third personalization information PI_3 based on the length data LENGTH_PERSO_2 of the second personalization information PI_2, read the third personalization tag TAG_PERSO_3, and match the third personalization tag TAG_PERSO_3 with the third personalization category PERSO_3. Since the third personalization tag TAG_PERSO_3 is matched to the third personalization category PERSO_3, the first code generator 331 may detect the third personalization information PI_3.

The first code generator 331 may detect the service operator information matched to the second service operator OP_2 from among the plurality of pieces of service operator information SOI_3_1 through SOI_3_M included in the value data VALUE_PERSO_3 of the detected third personalization information PI_3. First, the first code generator 331 may read and match a first operator tag TAG_OP_1 of the first service operator information SOI_3_1 with the second service operator OP_2. Since, the first operator tag TAG_OP_1 and the second service operator OP_2 are mismatched, the first code generator 331 may find a location of a second operator tag TAG_OP_2 of the second service operator information SOI_3_2 based on length data LENGTH_OP_1 of the first service operator information SOI_3_1 and read and match the second operator tag TAG_OP_2 with the second service operator OP_2. Since the second operator tag TAG_OP_2 and the second service operator OP_2 are matched, the first code generator 331 may detect the second service operator information SOI_3_2 and extract a reference source code RS_code from second operator value data VALUE_OP_2 of the second service operator information SOI_3_2.

The first code generator 331 may generate the reference code RC by using the reference source code RS_code. According to an example embodiment, when the reference code RC is encoded by using a certain encoding method and stored in the data storage 340 as the reference source code RS_code, the first code generator 331 may generate the reference code RC by decoding the reference source code RS_code. However, it is only an example embodiment, and when the reference code RC is not encoded, the first code generator 331 may transmit the reference source code RS_code extracted from the data storage 340 to the comparator 333 as the reference code RC. The second code generator 332 may need a different user source code to generate the user code UC, according to an activated personalization category. Thus, the second code generator 332 may extract at least one user source code necessary to generate the user code UC from information stored in the smart card 350, based on the first information Act_PT indicating that the received third personalization category PERSO_3 is activated.

In FIG. 7B, at least one of the activated personalization category and the pre-set service operator that the first code generator 331 uses to extract the reference source code RS_code may be changed later. FIG. 7C illustrates an operation of the personalization module 330 when the activated personalization category is changed from the third personalization category PERSO_3 to the second personalization category PERSO_2 and the pre-set second service operator OP_2 is changed to the first service operator OP_1.

Referring to FIGS. 3 and 7C, when the pre-set service operator is changed from the second service operator OP_2 to the first service operator OP_1, an additional update operation may not be performed on the personalization management information stored in the data storage 340, and the personalization module 330 may newly detect the personalization information and the service operator information. The first code generator 331 of the personalization module 330 may detect the second personalization information PI_2 including the second personalization tag TAG_PERSO_2 matched to the second personalization category PERSO_2 by using the same method as described with reference to FIG. 7B. Then, the first code generator 331 may detect the first service operator information SOI_2_1 matched to the first service operator OP_1 from among the plurality of pieces of service operator information SOI_2_1 through SOI_2_M included in the value data VALUE_PERSO_2 of the detected second personalization information PI_2. The first code generator 331 may extract a reference source code RS_code' from the operator value data VALUE_OP_1 of the first service operator information SOI_2_1.

As described above, the UE according to the example embodiments may perform a rapid personalization operation since there is no need for an additional operation of updating the personalization management information stored in the data storage, even if the activated personalization category and the pre-set service operator are changed later.

Figure 8A:
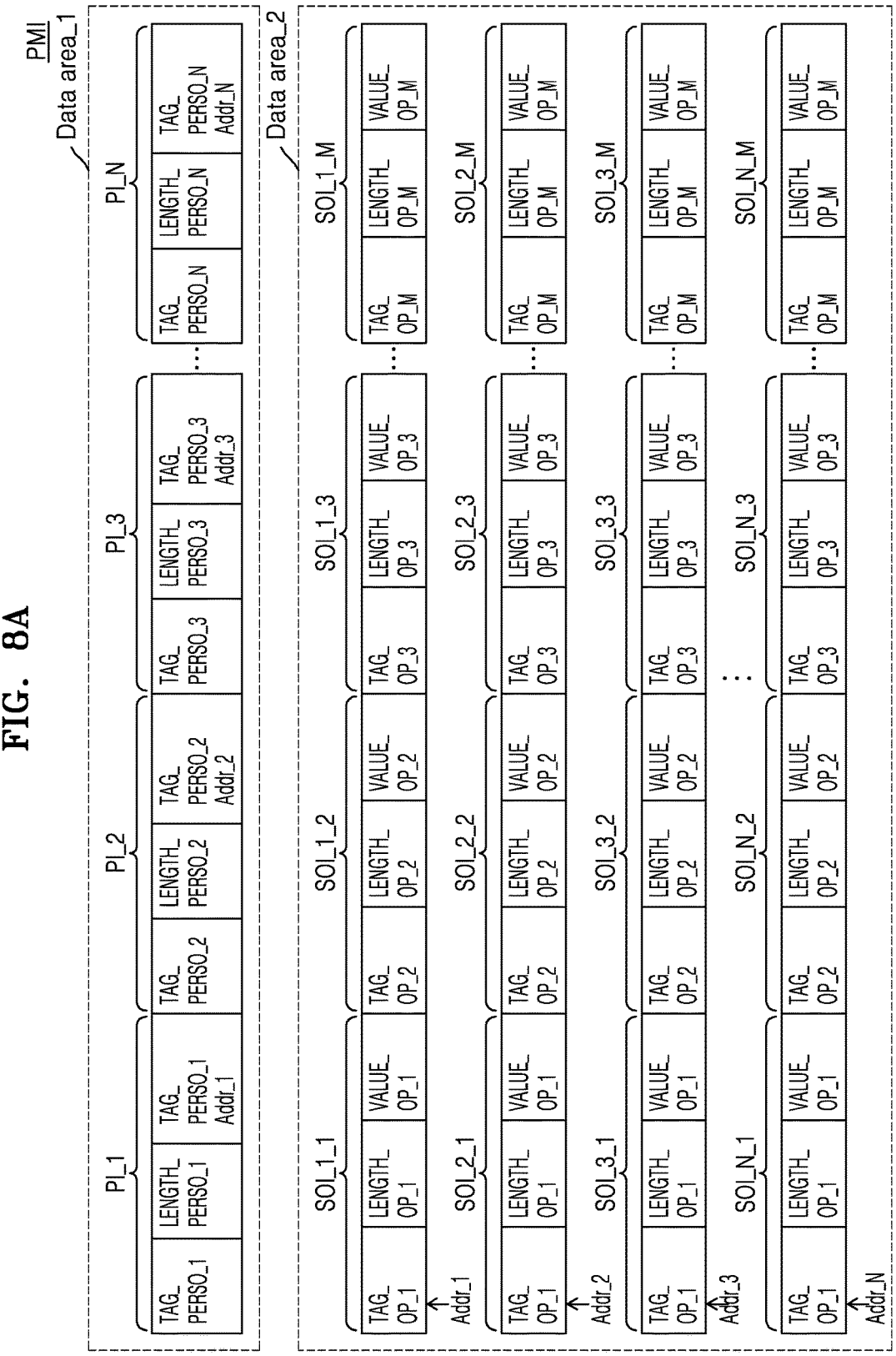
FIGS. 8A through 8B are diagrams for describing a personalization operation of user equipment, according to another example embodiment.
Figure 8B:
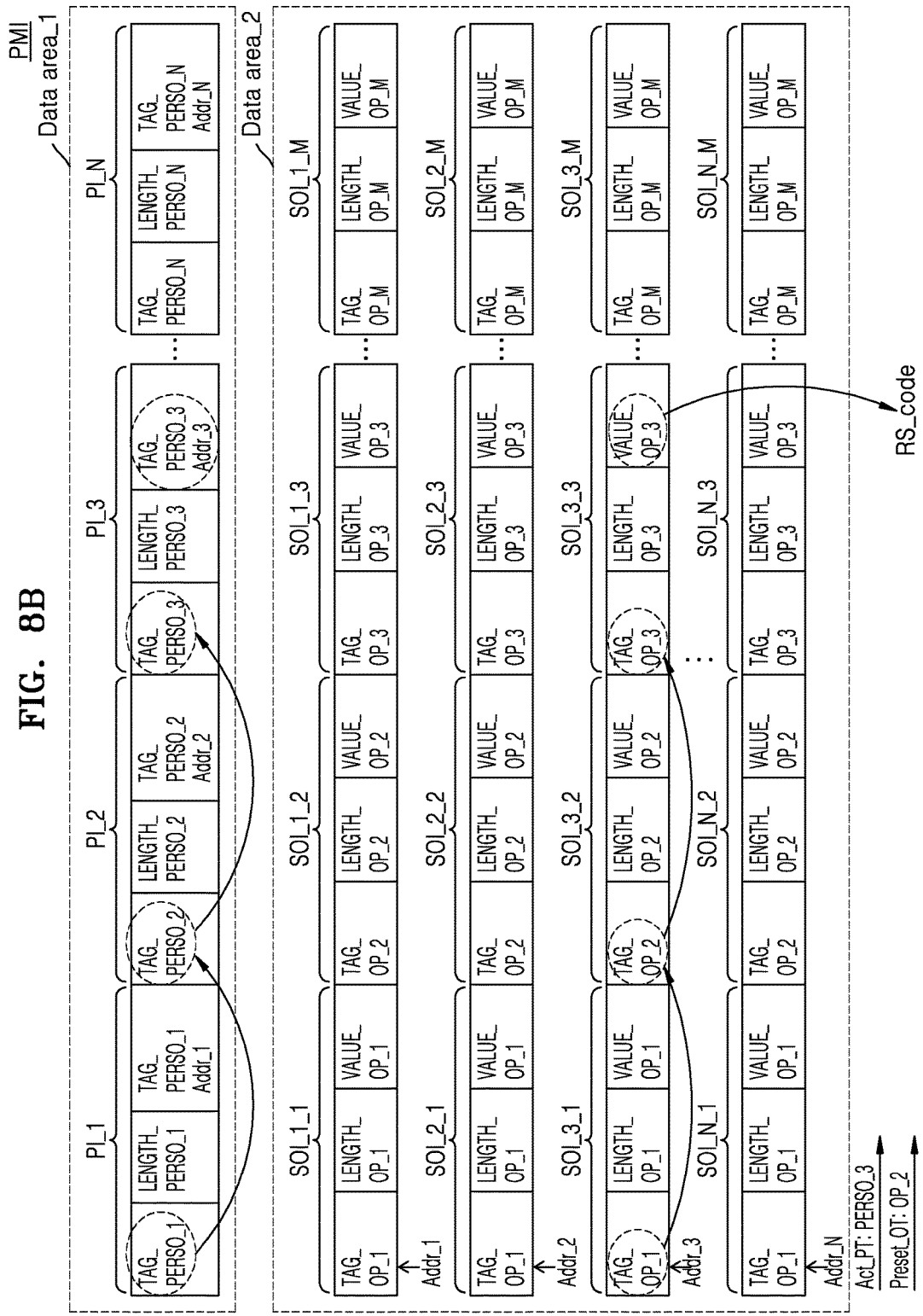

FIGS. 8A through 8B are diagrams for describing a personalization operation of UE according to another example embodiment.

Referring to FIG. 8A, the personalization management information PMI may include first through $N^{th}$ pieces of personalization information PI_1 through PI_N, and first through $M^{th}$ pieces of service operator information SOI_1_1 through SOI_1_M, SOI_2_1 through SOI_2_M, SOI_3_1 through SOI_3_M, . . . , SOI_N_1 through SOI_N_M corresponding to each of the pieces of personalization information PI_1 through PI_N. The personalization management information PMI may be stored in the data storage 340 of FIG. 3. According to an example embodiment, the first through $N^{th}$ pieces of personalization information PI_1 through PI_N may be stored in a first data area Data_area_1 of the data storage 340, and the first through $M^{th}$ pieces of service operator information SOI_1_1 through SOI_1_M, SOI_2_1 through SOI_2_M, SOI_3_1 through SOI_3_M, . . . , SOI_N_1 through SOI_N_M corresponding to each of the pieces of personalization information PI_1 through PI_N may be stored in a second data area Data_area_2 of the data storage 340. According to an example embodiment, the first through $N^{th}$ pieces of personalization information PI_1 through PI_N may be sequentially stored in the first data area Data_area_1. For example, the N-$1^{th}$ personalization information PI_N-1 may be stored in an area of the first data area Data_area_1 of the data storage 340 of FIG. 3, and the $N^{th}$ personalization information PI_N may be stored in an area adjacent to the area of the first data area Data_area_1, in which the N-$1^{th}$ personalization information PI_N-1 is stored. As a result, a distance between areas in which the N-$1^{th}$ personalization information PL_N-1 and the $N^{th}$ personalization information PL_N are stored may correspond to a value of the length data LENGTH_PERSO_N-1 of the N-$1^{th}$ personalization information PL_N-1.

Also, the plurality of pieces of service operator information SOI_1_1 through SOI_1_M, SOI_2_1 through SOI_2_M, SOI_3_1 through SOI_3_M, . . . , SOI_N_1 through SOI_N_M corresponding to each of the pieces of personalization information PI_1 through PI_N may be sequentially stored in a second data area Data_area_2 of the data storage 340. For example, the M-$1^{th}$ service operator information SOI_N_M-1 corresponding to the $N^{th}$ personalization information PI_N may be stored in an area of the second data area Data_area_2, and the $M^{th}$ service operator information SOI_N_M may be stored in an area adjacent to the area of the second data area Data_area_2, in which the M-$1^{th}$ service operator information SOI_N_M-1 is stored. As a result, a distance between areas in which the M-$1^{th}$ service operator information SOI_1_M-1 and the $M^{th}$ service operator information SOI_1_M are stored may correspond to a value of the length data LENGTH_OP_M-1 of the M-$1^{th}$ service operator information SOI_N_M-1.

Hereinafter, to describe the personalization information again, $N^{th}$ value data VALUE_PERSO_N of the $N^{th}$ personalization information PI_N may include a start address AddrN indicating a location of a point of the second data area Data_area_2, in which the first through $M^{th}$ pieces of service operator information SOI_N_1 through SOI_N_M are started to be stored. For example, the start address AddrN may be an address of a data area in which the first operator tag TAG_OP_1 of the first service operator information SOI_N_1 corresponding to the $N^{th}$ personalization information PI_N is stored. Also, the $N^{th}$ length data LENGTH_PERSO_N of the $N^{th}$ personalization information PI_N may indicate a data length of the $N^{th}$ value data VALUE_PERSO_N. That is, the $N^{th}$ length data LENGTH_PERSO_N of the $N^{th}$ personalization information PI_N may correspond to a data length of the start address AddrN.

Hereinafter, an operation of the personalization module 330 of FIG. 3 will be described in detail with reference to the illustration of FIG. 8B.

Referring to FIGS. 3 and 8B, the first code generator 331 may receive the first information Act_PT indicating that the third personalization category PERSO_3 is activated and the second information Preset_OT indicating that the second service operator OP_2 is pre-set. Also, the first code generator 331 may receive a start address corresponding to an address of the data storage 340 in which the first personalization tag TAG_PERSO_1 of the first personalization information PI_1 is stored. That is, the start address may indicate a point of the first data area Data_area_1 of the data storage 340, in which the plurality of pieces of personalization information PI_1 through PI_N are started to be stored.

With reference to the start address, first, the first code generator 331 may read and match the first personalization tag TAG_PERSO_1 of the first personalization information PI_1 with the third personalization category PERSO_3. Since the first personalization tag TAG_PERSO_1 and the third personalization category PERSO_3 are mismatched, the first code generator 331 may find a location of the second personalization tag TAG_PERSO_2 of the second personalization information PI_2 based on the length data LENGTH_PERSO_1 of the first personalization information PI_1 and read and match the second personalization tag TAG_PERSO_2 with the third personalization category PERSO_3. Since the second personalization tag TAG_PERSO_2 and the third personalization category PERSO_3 are mismatched, the first code generator 331 may find a location of the third personalization tag TAG_PERSO_3 of the third personalization information PI_3 based on the length data LENGTH_PERSO_2 of the second personalization information PI_2 and read and match the third personalization tag TAG_PERSO_3 with the third personalization category PERSO_3. Since the third personalization tag TAG_PERSO_3 and the third personalization category PERSO_3 are matched, the first code generator 331 may detect the third personalization information PI_3.

The first code generator 331 may access the first service operator information SOI_3_1 corresponding to the third personalization information PI_3 stored in the second data area Data_area_2 of the data storage 340, with reference to a third address Addr3 included in the value data VALUE_PERSO_3 of the detected third personalization information PI_3. The first code generator 331 may read and match the first operator tag TAG_OP_1 of the first service operator information SOI_3_1 with the second service operator OP_2. Since the first operator tag TAG_OP_1 and the second service operator OP_2 are mismatched, the first code generator 331 may find a location of the second operator tag TAG_OP_2 of the second service operator information SOI_3_2 based on the length data LENGTH_OP_1 of the first service operator information SOI_3_1, and read and match the second operator tag TAG_OP_2 with the second service operator OP_2. Since the second operator tag TAG_OP_2 and the second service operator OP_2 are matched, the first code generator 331 may detect the second service operator information SOI_3_2 and extract a reference source code RS_code from the second operator value data VALUE_OP_2 of the second service operator information SOI_3_2. Sequential operations of the personalization module 330 are described in detail with reference to FIG. 7B, and thus, will not be repeatedly described.

Figure 9:
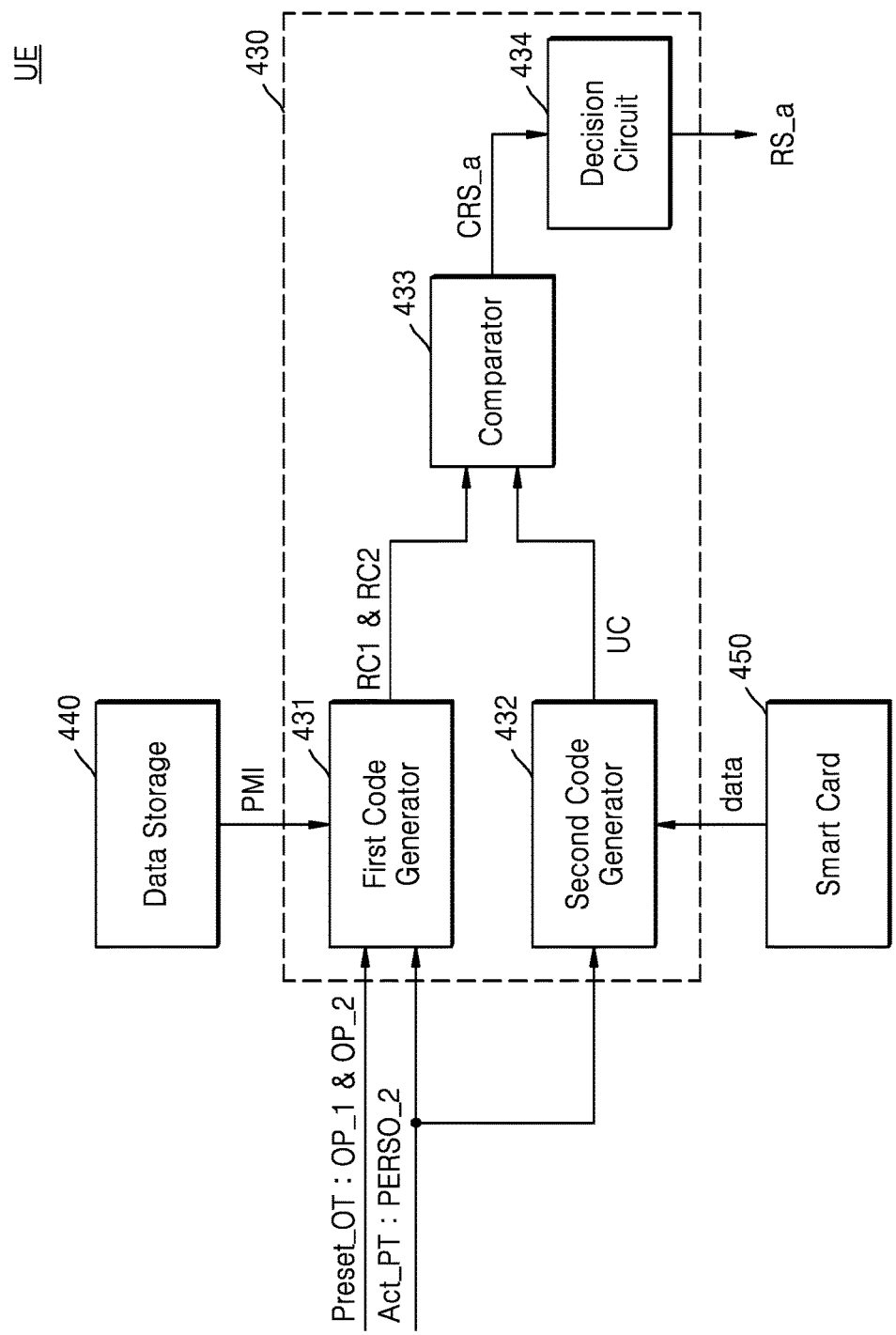
FIG. 9 is a block diagram for describing an operation of a personalization module of user equipment, according to another example embodiment.

FIG. 9 is a block diagram for describing an operation of a personalization module 430 of UE according to another example embodiment.

Referring to FIG. 9, the personalization module 430 may include a first code generator 431, a second code generator 432, a comparator 433, and a decision circuit 434. According to an example embodiment, the first code generator 431 may generate a plurality of user codes in response to received second information Preset_OT indicating a plurality of pre-set service operators. In detail, the first code generator 431 may use first information Act_PT indicating a second personalization category PERSO_2 activated by the first processor 120 and the second information Preset_OT indicating a first pre-set service operator OP_1 and a second pre-set service operator OP_2 to extract a first data set DS_1a from personalization management information of a data storage 440. For example, referring to FIG. 7A, the first data set DS_1a may include the first operator value data VALUE_OP_1 of the first service operator information SOI_2_1 corresponding to the second personalization information PI_2 and the second operator value data VALUE_OP_2 of the second service operator information SOI_2_2.

The first code generator 431 may generate a first reference code RC1 by using the first operator value data VALUE_OP_1 of the first service operator information SOI_2_1 and a second reference code RC2 by using the second operator value data VALUE_OP_2 of the second service operator information SOI_2_2. The first code generator 431 may provide the first reference code RC1 and the second reference code RC2 to the comparator 433. The second code generator 432 may use the first information Act_PT to extract a second data set DS_2a from information stored in the smart card 450 and generate the user code UC. The second code generator 432 may provide the user code UC to the comparator 433.

The comparator 433 may compare the first reference code RC1 with the user code UC to determine whether the first reference code RC1 corresponds to the user code UC, and compare the second reference code RC2 with the user code UC to determine whether the second reference code RC2 corresponds to the user code UC. The comparator 433 may transmit a comparison result signal CRS_a to the decision unit 434. According to an example embodiment, when the plurality of reference codes RC1 and RC2 are generated by the second information Preset_OT indicating the plurality of pre-set service operators, the decision circuit 434 may determine that a user may use a service, when at least one of the plurality of reference codes RC1 and RC2 corresponds to the user code UC. In detail, the decision circuit 434 may determine whether the user who aims to use the service may use the service, based on the comparison result signal CRS. According to an example embodiment, when either one or both of the first reference code RC1 and the second reference code RC2 corresponds to the user code UC, the decision circuit 434 may determine that the user may use the service, and when neither the first reference code RC1 nor the second reference code RC2 corresponds to the user code UC, the decision circuit 434 may determine that the user may not use the service. The decision circuit 434 may generate a determination result signal RS_a and transmit the determination result signal RS to the processor 120 of FIG. 1.

Figure 10:
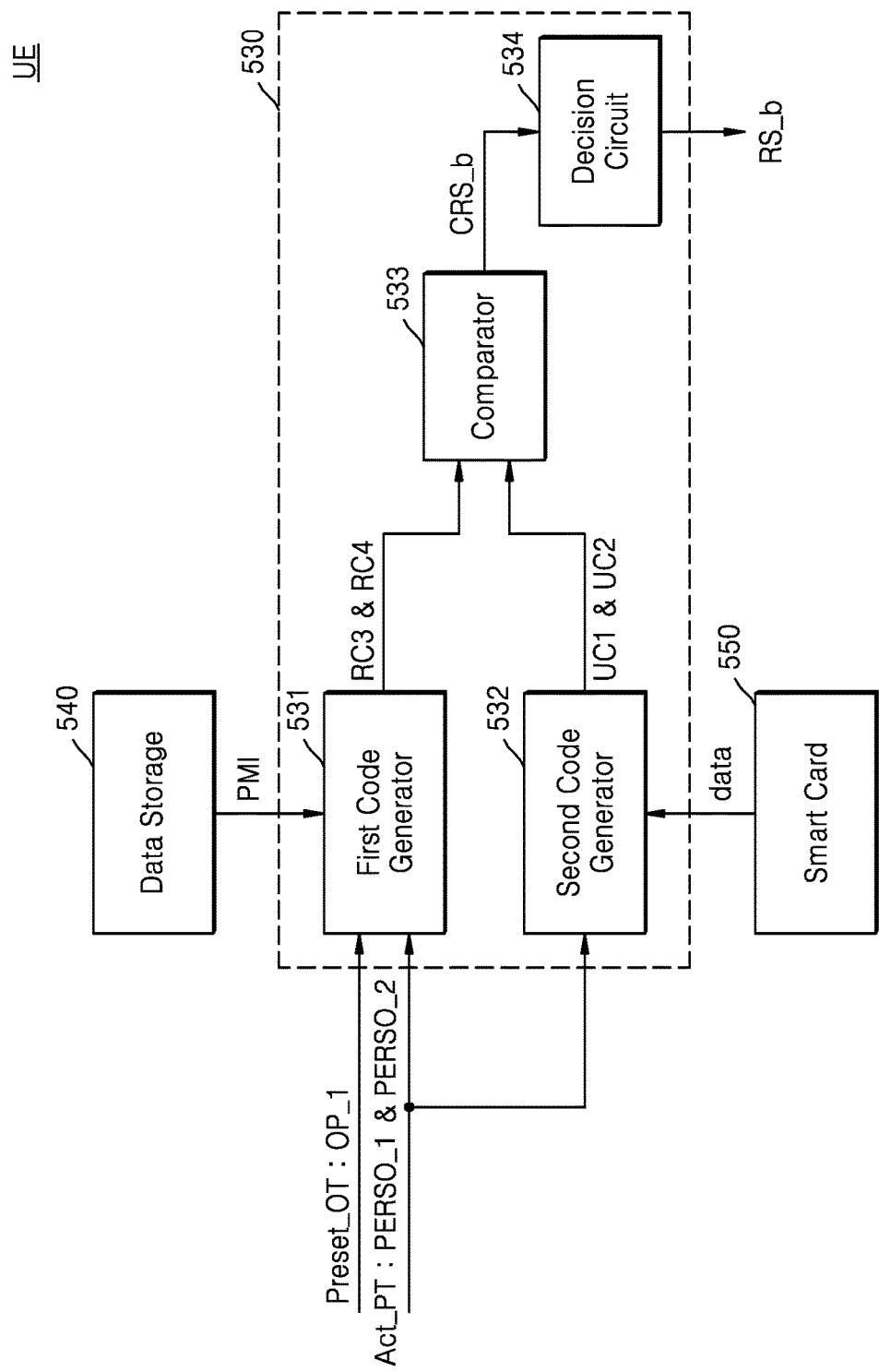
FIG. 10 is a block diagram for describing an operation of a personalization module of user equipment, according to another example embodiment.

FIG. 10 is a block diagram for describing an operation of a personalization module 530 of UE according to another example embodiment.

Referring to FIG. 10, the personalization module 530 may include a first code generator 531, a second code generator 532, a comparator 533, and a decision circuit 534. According to an example embodiment, the first code generator 531 may generate a plurality of reference codes in response to received first information Act_PT indicating a plurality of activated personalization categories. In detail, the first code generator 531 may extract a first data set DS_1b from personalization management information of a data storage 540, by using the first information Act_PT indicating a first personalization category PERSO_1 and a second personalization category PERSO_2 activated by the processor 120, and second information Preset_OT indicating a pre-set first service operator OP_1. For example, referring to FIG. 7A, the first data set DS_1b may include the first operator value data VALUE_OP_1 of the first service operator information SOI_1_1 corresponding to the first personalization information PI_1 and the second operator value data VALUE_OP_2 of the second service operator information SOI_2_1 corresponding to the second personalization information PI_2.

The first code generator 531 may generate a third reference code RC3 by using the first operator value data VALUE_OP_1 of the first service operator information SOI_1_1 and a fourth reference code RC4 by using the second operator value data VALUE_OP_2 of the second service operator information SOI_2_1. The first code generator 531 may provide the third reference code RC3 and the fourth reference code RC 4 to the comparator 533.

According to an example embodiment, the second code generator 532 may generate a plurality of user codes in response to the received first information Act_PT indicating the plurality of activated personalization categories. In detail, the second code generator 532 may generate a first user code UC1 corresponding to the first personalization category PERSO_1 and a second user code UC2 corresponding to the second personalization category PERSO_2 by extracting a second data set DS_2b from information stored in the smart card 450 by using the first information Act_PT. The second code generator 432 may provide the first user code UC1 and the second user code UC2 to the comparator 533.

The comparator 533 may compare the third reference code RC3 with the first user code UC1 and the fourth reference code RC4 with the second user code UC2 to determine whether the third reference code RC corresponds to the first user code UC1 and the fourth reference code RC4 corresponds to the second user code UC2, respectively. The comparator 533 may transmit a comparison result signal CRS_b to the decision unit 534. The decision unit 534 may determine whether a user who aims to use a service may use the service, based on the comparison result signal CRS. According to an example embodiment, when the plurality of reference codes RC3 and RC4 are generated by using the first information Act_PT indicating the plurality of activated personalization categories, and the plurality of user codes, for example, the first and second user codes UC1 and UC2, are generated, the decision circuit 534 may determine that the user may use the service when the reference codes RC3 and RC4 correspond to the first and second user codes UC1 and UC2, respectively. In detail, when the third reference code RC3 corresponds to the first user code UC1 and the fourth reference code RC4 corresponds to the second user code UC2, the decision circuit 534 may determine that the current user may use the service. When the third reference code RC3 does not correspond to the first user code UC1 or the fourth reference code RC4 does not correspond to the second user code UC2, the decision circuit 534 may determine that the user may not use the service. The decision unit 534 may generate a determination result signal RS_b and transmit the determination result signal RS to the processor 120 of FIG. 1.

Figure 11:
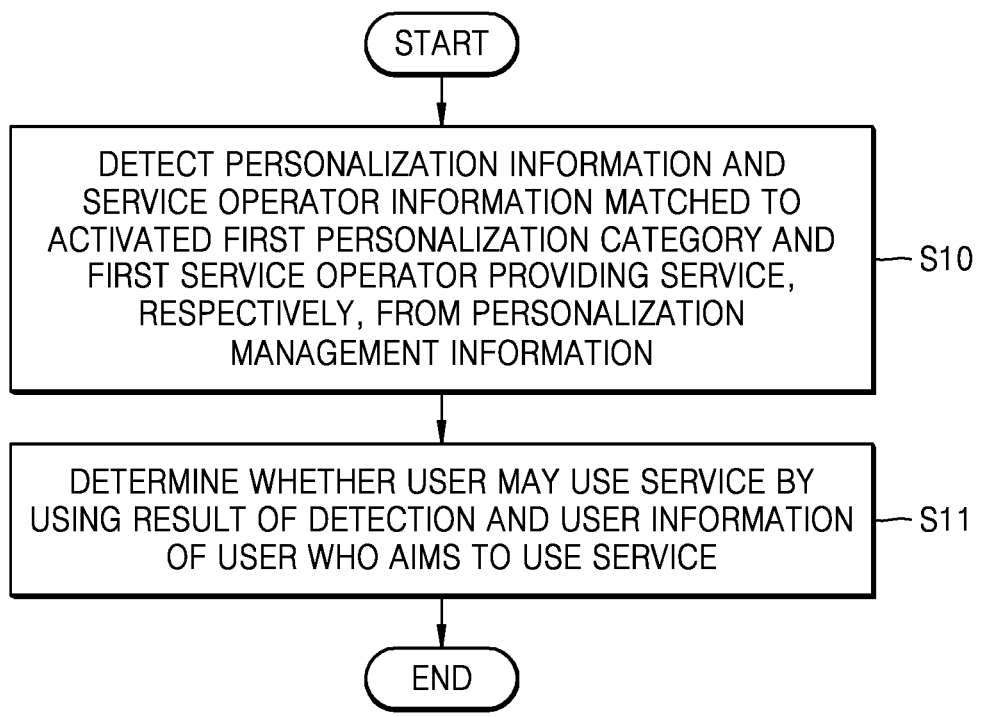
FIG. 11 is a flowchart of an operating method of user equipment for personalization, according to an example embodiment.

FIG. 11 is a flowchart of an operating method of UE for personalization, according to an example embodiment.

Referring to FIG. 11, the personalization information and the service operator information matched to the activated first personalization category and the first service operator providing the service, respectively, are detected from the personalization management information including the plurality of pieces of personalization information and the plurality of pieces of service operator information corresponding to each of the plurality of pieces of personalization information (S10). Thereafter, whether a user may use a service is determined by using a result of the detection and user information of the user who aims to use the service (S11).

Figure 12:
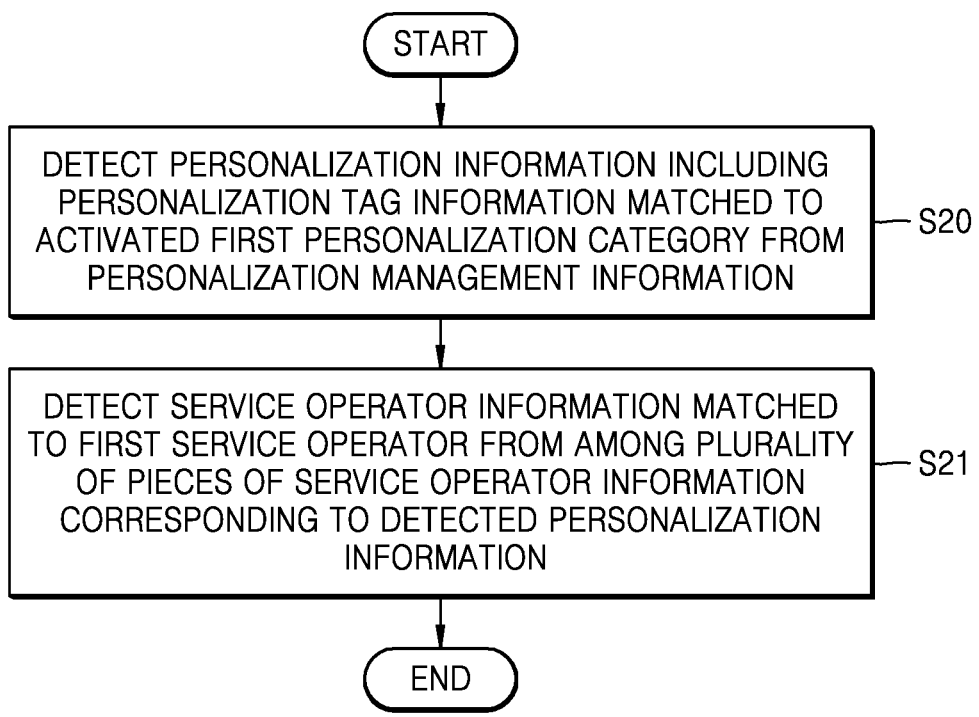
FIG. 12 is a flowchart of a method of detecting personalization information and service operator information of user equipment, according to an example embodiment.

FIG. 12 is a flowchart of a method of detecting personalization information and service operator information of UE, according to an example embodiment.

Referring to FIG. 12, the personalization information including the personalization tag matched to the activated first personalization category is detected from the plurality of pieces of personalization information (S20). The service operator information including the operator tag matched to the first service operator is detected from the plurality of pieces of service operator information corresponding to the detected personalization information (S21).

Figure 13:
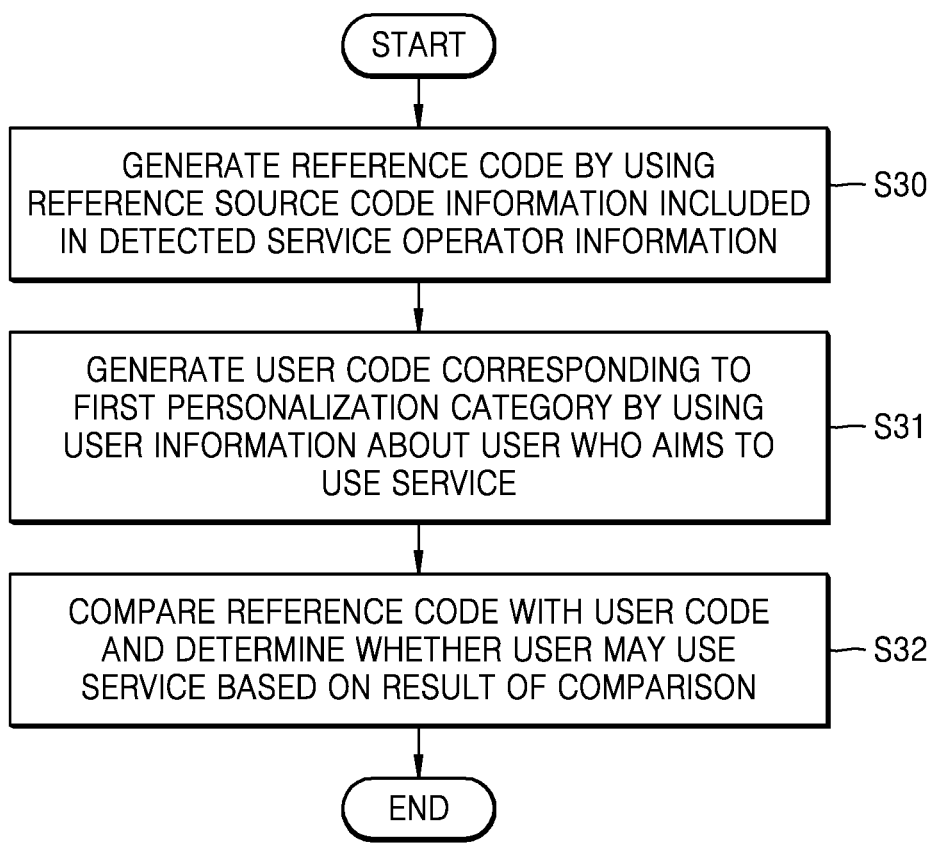
FIG. 13 is a flowchart of a method of determining whether a current user is able to use a service, via user equipment, according to an example embodiment.

FIG. 13 is a flowchart of a method of determining whether a current user may use a service, via UE, according to an example embodiment.

Referring to FIG. 13, the reference code is generated by using the operator value data included in the detected service operator information (S30). The user code corresponding to the first personalization category is generated by using the user information of the user who aims to use the service (S31). The reference code and the user code are compared and whether the user may use the service may be determined based on a result of the comparison (S32).

Figure 14:
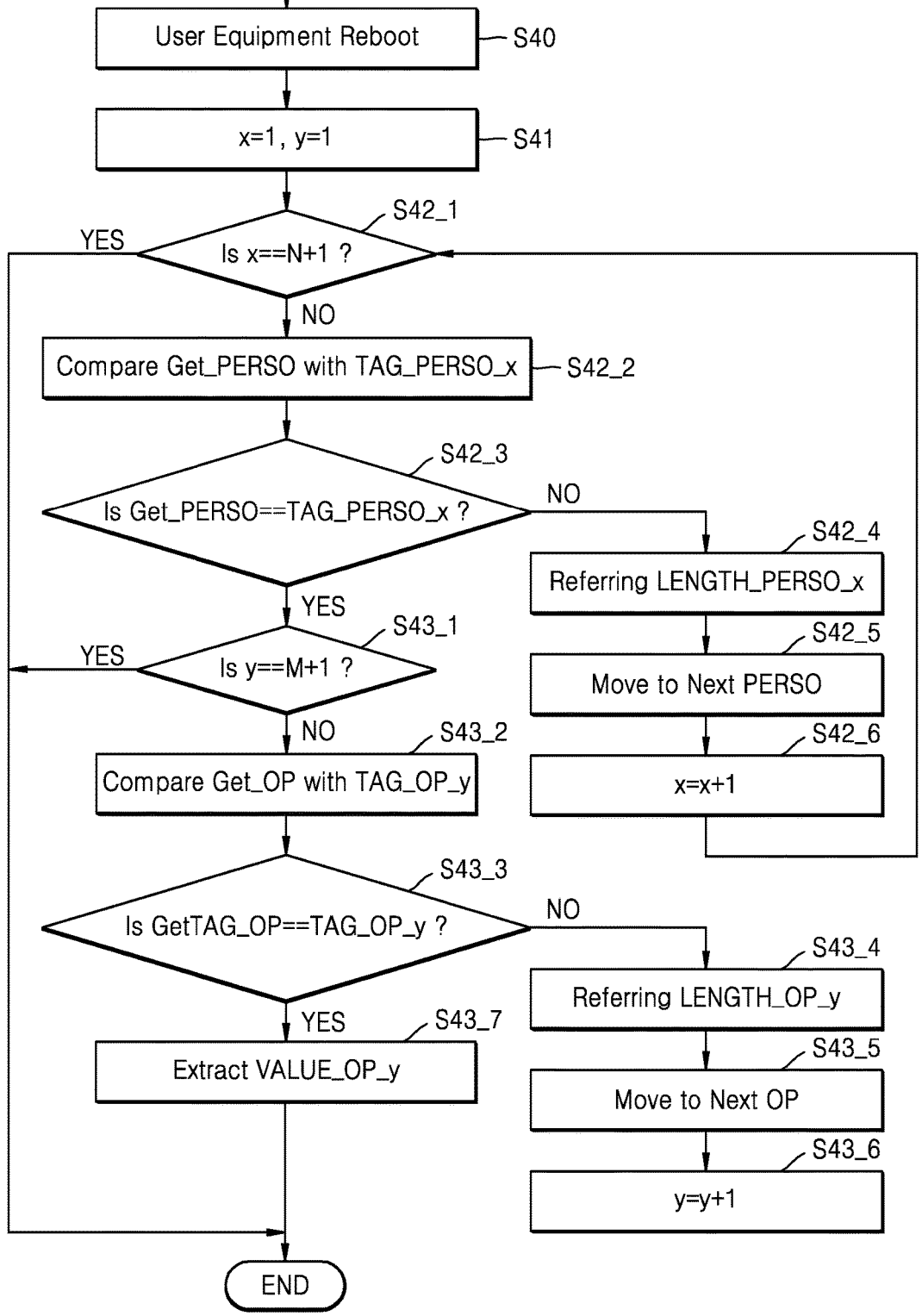
FIG. 14 is a flowchart of a method of detecting personalization information and service operator information via a personalization module, according to an example embodiment.

FIG. 14 is a flowchart of a method of detecting personalization information and service operator information via a personalization module, according to an example embodiment.

Referring to FIG. 14, the personalization operation is performed when the UE is booted (S40). According to an example embodiment, when the UE is turned on, or the smart card is inserted into the UE, the UE is booted or re-booted and may perform the personalization operation. In order for the UE to detect the personalization information and the service operator information corresponding to an activated personalization category Get_PERSO and a pre-set service operator Get_OP, respectively, from the personalization management information, first, the UE sets x and y as 1 (S41). To detect the personalization information matched to the activated personalization category Get_PERSO from among a plurality of pieces of personalization information, the UE determines whether a value of x is N+1 (S42_1). N may indicate the number of pieces of personalization information. When the value of x is not N+1 (S42_1, N), the activated personalization category Get_PERSO and an $x^{th}$ personalization tag TAG_PERSO_x included in the $x^{th}$ personalization information are compared (S42_2). When the activated personalization category Get_PERSO and the $x^{th}$ personalization tag TAG_PERSO_x are not matched (S42_3, NO), the next personalization information of the $x^{th}$ personalization information is searched for (S42_5) by referring to $x^{th}$ length data LENGTH_PERSO_x included in the $x^{th}$ personalization information (S42_4.) Thereafter, 1 is added to the value of x (S42_6). Then, the operation of detecting the $x^{th}$ personalization information including the $x^{th}$ personalization tag TAG_PERSO_x matched to the activated personalization category Get_PERSO is repeated (S42_1 through S42_6) until the value of x becomes N+1.

When the $x^{th}$ personalization information including the $x^{th}$ personalization tag TAG_PERSO_x matched to the activated personalization category Get_PERSO is detected (S42_3, YES), the UE may determine whether a value of y is M+1 (S43_1) in order to detect the service operator information matched to the pre-set service operator Get_OP from among a plurality of pieces of service operator information corresponding to the $x^{th}$ personalization information. M may indicate the number of pieces of service operator information corresponding to the $x^{th}$ personalization information. When the value of y is not M+1 (S43_1, N), the pre-set service operator Get_OP and a $y^{th}$ operator tag TAG_OP_y included in the $y^{th}$ service operator information are compared (S43_2). When the pre-set service operator Get_OP and the $y^{th}$ operator tag TAG_OP_y included in the $y^{th}$ service operator information are not matched (S43_3, NO), the next personalization information of the $y^{th}$ service operator information is searched for (S43_5) by referring to $y^{th}$ length data LENGTH_OP_y included in the $y^{th}$ service operator information (S43_4). Thereafter, 1 is added to the value of y (S43_6). Then, the operation of detecting the $y^{th}$ service operator information including the $y^{th}$ operator tag TAG_OP_y matched to the pre-set service operator Get_OP is repeated (S43_1 through S43_6) until the value of y becomes M+1.

When the $y^{th}$ service operator information including the $y^{th}$ operator tag TAG_OP_y matched to the pre-set service operator Get_OP is detected (S43_3, YES), $y^{th}$ operator value data VALUE_OP_y included in the $y^{th}$ service operator information is extracted (S43_7). Also, according to an example embodiment, when the $x^{th}$ personalization information including the $x^{th}$ personalization tag TAG_PERSO_x matched to the activated personalization category Get_PERSO is not detected until the value of x becomes N+1 (S42_1, Y), or the $y^{th}$ service operator information including the $y^{th}$ operator tag TAG_OP_y matched to the pre-set service operator Get_OP is not detected until the value of y becomes M+1 (S43_1, Y), the user may determine to use the service by using the UE. According to another example embodiment, the UE may update the personalization management information by receiving new personalization management information from the outside and storing the new personalization management information.

Figure 15:
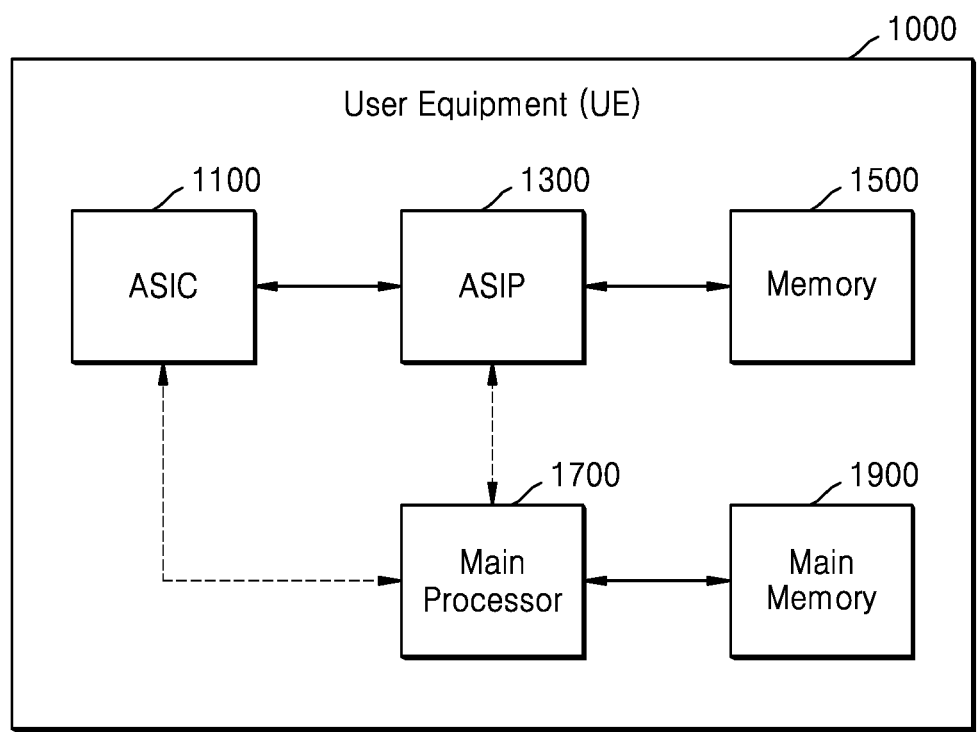
FIG. 15 is a block diagram of user equipment according to an example embodiment.

FIG. 15 is a block diagram of UE 1000 according to an example embodiment.

As illustrated in FIG. 15, the UE 1000 may include an application specific integrated circuit (ASIC) 1100, an application specific instruction set processor (ASIP) 1300, a memory 1500, a main processor 1700, and a main memory 1900. At least two of the ASIC 1100, the ASIP 1300, and the main processor 1700 may communicate with each other. Also, at least two of the ASIC 1100, the ASIP 1300, the memory 1500, the main processor 1700, and the main memory 1900 may be installed in one chip.

The ASIC 1100 is an integrated circuit customized for particular purposes. For example, the ASIC 1100 may include a radio frequency integrated circuit (RFIC), a modulator, a demodulator, etc. The ASIP 1300 may support an exclusive instruction set for particular applications, and execute instructions included in the instruction set. The memory 1500 may communicate with the ASIP 1300 and may be a non-transitory storage medium configured to store a plurality of instructions executed by the ASIP 1300. For example, the memory 1500 may include random types of memory which may be accessed by the ASIP 1300, such as random access memory (RAM), read only memory (ROM), a tape, a magnetic disk, an optical disk, a volatile memory, a non-volatile memory, and a combination thereof.

The main processor 1700 may control the UE 1000 by executing the plurality of instructions. For example, the main processor 1700 may control the ASIC 1100 and the ASIP 1300, and may process data received via a wireless communication network or a user input received by the UE 1000. The main memory 1900 may communicate with the main processor 1700, and may be a non-transitory storage medium configured to store a plurality of instructions executed by the main processor 1900. For example, the main memory 1900 may include random types of memory which may be accessed by the main processor 1700, such as RAM, ROM, a tape, a magnetic disk, an optical disk, a volatile memory, a non-volatile memory, and a combination thereof.

The components of the UE according to the example embodiments or the operations included in the operation of personalization via the UE may be included in at least one of the components included in the UE 1000 of FIG. 15. For example, the personalization module 130 of FIG. 1 may be realized as the plurality of instructions stored in the memory 1500, and the operation of the personalization module 130 may be performed as the ASIP 1300 executes the plurality of instructions stored in the memory 1500. As another example, the personalization module 130 of FIG. 1 may be realized as a hardware block and included in the ASIC 1100. As another example, the personalization module 130 of FIG. 1 may be realized as the plurality of instructions stored in the main memory 1900, and the operation of the personalization module 130 may be performed as the main processor 1700 executes the plurality of instructions stored in the main memory 1900.

Figure 16:
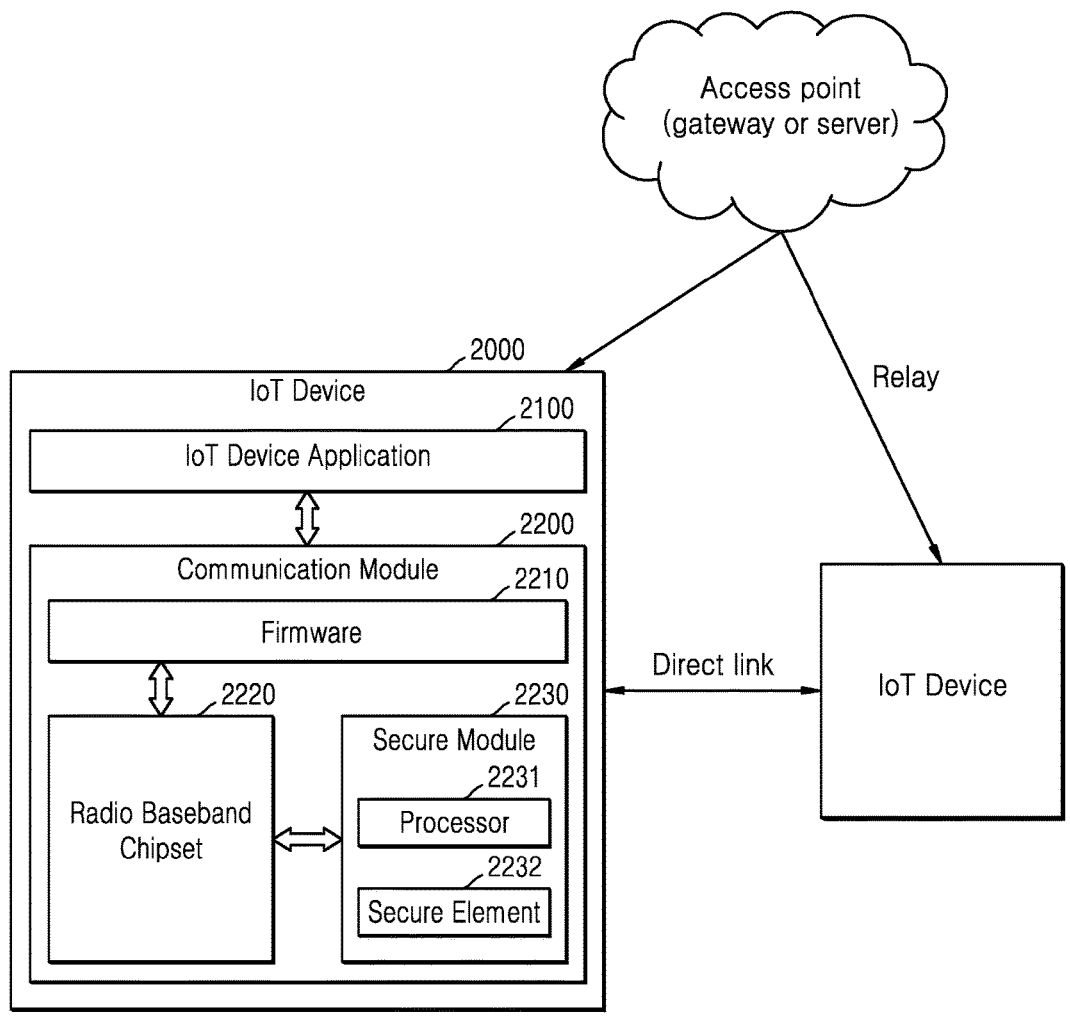
FIG. 16 is a block diagram of an example in which a communication method according to example embodiments is applied to internet of things (IoT).

FIG. 16 is a block diagram of an example in which a communication method according to example embodiments is applied to internet of things (IoT).

The IoT may refer to a network between things using wired/wireless communication. Also, an IoT device 2000 may include devices having an accessible wired or wireless interface, and transmitting or receiving data to and from at least another device by communicating with the other device via the wired/wireless interface. For example, the IoT device 2000 may correspond to various types of devices which may perform communication, such as a refrigerator, an air-conditioner, a telephone, an automobile, etc.

The example embodiments of the present inventive concept described above may be applied to the IoT. For example, the base station described above may be applied to an access point (AP), a gateway, a server, etc. in the IoT. Also, the terminals described above may correspond to the IoT device 2000. Any one IoT device may communicate with another IoT device via the access point, the gateway, etc., or the IoT devices may perform device-to-device (D2D) communication according to the embodiments described above.

Referring to FIG. 16, the IoT device 2000 may include an IoT device application 2100 and a communication module 2200. The communication module 2200 may include firmware 2210, a radio baseband chip set 2220, a security module 2230, etc.

The IoT device application 2100 may control the communication module 2200 as a software component, and may be executed by a central processing unit (CPU) (not shown) in the IoT device 2000. The communication module 2200 may refer to a wireless communication component which may be connected to or exchange data with LAN, WLAN such as Wi-fi, wireless universal serial bus (USB), ZigBee, or a mobile communication network.

The firmware 2210 may provide the IoT device application 2100 and an application programming interface (API), and may control the radio baseband chipset 2220 according to control of the IoT device application 2100. The radio baseband chipset 2220 may provide connectivity to the wireless communication network. The security module 2230 may include a processor 2231 and a security element 2232. The security module 2232 may authenticate the IoT device 2000 to be connected to the wireless communication network, and authenticate the IoT device 2000 for an access to services of the wireless network.

The IoT device 2000 may perform the personalization operation according to the above-described example embodiments according to the present inventive concept. Via the personalization operation, the IoT device 2000 may determine whether a current user may use a communication service with another IoT device. The security element 2232 may include the personalization module 130 and/or the data storage 140 configured to store the personalization management information, described with reference to FIG. 1. The IoT device 2000 may extract the activated personalization category and the information matched to the service operator from the personalization management information and perform the personalization operation based on the extracted activated personalization category and information matched to the service operator.

While the inventive concept has been particularly shown and described with reference to example embodiments thereof, it will be understood that various changes in form and details may be made therein without departing from the spirit and scope of the following claims.

What is claimed is:

1. An operating method of user equipment configured to personalize use of a service, wherein the user equipment comprises a storage configured to store personalization management information comprising a plurality of pieces of personalization information and a plurality of pieces of service operator information corresponding to each of the plurality of pieces of personalization information, the operating method comprising:
 accessing the storage to read the personalization management information and, from the personalization management information, detecting personalization information and service operator information matched to reference information registered in the user equipment; and
 determining whether a user is able to use the service, by using user information and a result of the detecting.

2. The operating method of claim 1, wherein the reference information comprises at least one activated personalization category, based on which the user equipment personalizes the use of service, from among a plurality of personalization categories, and information indicating at least one pre-set service operator providing the service.

3. The operating method of claim 2, wherein the detecting comprises:
 detecting personalization information matched to the at least one activated personalization category; and
 detecting the service operator information matched to the at least one pre-set service operator from among the plurality of pieces of service operator information corresponding to the personalization information that is detected.

4. The operating method of claim 2, wherein the plurality of personalization categories comprise network personalization, network subset personalization, service operator personalization, corporate personalization, and SIM/USIM personalization.

5. The operating method of claim 2, wherein each of the plurality of pieces of personalization information comprises:
 a personalization tag indicating a personalization category;
 value data indicating the service operator information corresponding to the personalization category; and
 length data about the personalization information.

6. The operating method of claim 5, wherein the detecting comprises:
 attempting to match the at least one activated personalization category with a personalization tag comprised in first personalization information from among the plurality of pieces of personalization information; and
 when a result of the matching is a mismatch, determining a location of second personalization information by using length data comprised in the first personalization information and attempting to match the at least one activated personalization category with a personalization tag comprised in the second personalization information.

7. The operating method of claim 2, wherein each of the plurality of pieces of service operator information comprises:
 an operator tag indicating a type of the service operator;
 operator value data corresponding to the type of the service operator; and
 length data about the service operator information.

8. The operating method of claim 7, wherein the detecting comprises:
 when the personalization information matched to the at least one activated personalization category is detected, attempting to match the at least one pre-set service operator with an operator tag comprised in first service operator information from among the plurality of pieces of service operator information corresponding to the personalization information that is detected; and
 when a result of the matching is a mismatch, determining a location of second service operator information by using length data comprised in the first service operator information and attempting to match the at least one pre-set service operator with an operator tag comprised in the second service operator information.

9. The operating method of claim 7, wherein the operator value data comprises a plurality of reference source codes, and an identifier configured to identify each of the plurality of reference source codes.

10. The operating method of claim 7, wherein the determining of whether a user is able to use the service comprises:
 when the personalization information matched to the at least one activated personalization category and the service operator information matched to the at least one pre-set service operator are detected,
 generating a reference code by using the operator value data of the service operator information that is matched;
 generating a user code corresponding to the at least one activated personalization category by using the user information; and
 comparing the reference code with the user code, and determining whether the user is able to use the service based on a result of the comparing.

11. The operating method of claim 2, further comprising:
 changing the at least one pre-set service operator from a first service operator to a second service operator;
 newly detecting personalization information and service operator information matched to the at least one activated personalization category and the second service operator, respectively, from the personalization management information; and
 determining whether the user is able to use the service by using the user information and a result of the newly detecting.

12. The operating method of claim 1, wherein the determining of whether a user is able to use the service comprises:
 when the personalization information matched to the reference information is not detected, or when the service operator information matched to the reference information is not detected,
 allowing the user to determine to use the service.

13. User equipment for using a service, the user equipment comprising:
 a hardware storage configured to store personalization management information comprising a plurality of pieces of personalization information and a plurality of pieces of service operator information corresponding to each of the plurality of pieces of personalization information;
 a smart card configured to store user information about a user; and
 at least one memory configured to store computer program code, and at least one central processing unit (CPU) configured to access the at least one memory and operate according to the computer program code, the computer program code including:

personalization code configured to cause at least one of the at least one CPU to detect personalization information and service operator information matched to an activated personalization category from among a plurality of personalization categories and a service operator, respectively, from the personalization management information, and determine whether the user is able to use the service, by using a result of the detection and the user information.

14. The user equipment of claim 13, wherein the personalization code is configured to cause the at least one of the at least one CPU to detect personalization information matched to the activated personalization category from among the plurality of pieces of personalization information, as a first priority, and service operator information matched to the service operator from among the plurality of pieces of service operator information corresponding to the detected personalization information, as a second priority.

15. The user equipment of claim 13, wherein the personalization code is configured to cause the at least one of the at least one CPU to extract at least one reference source code from the service operator information that is detected, generate a reference code by using the reference source code, extract at least one user source code corresponding to the activated personalization category from the user information, generate a user code by using the at least one user source code that is extracted, and determine whether the user is able to use the service by comparing the reference code with the user code.

16. The user equipment of claim 15, wherein the user is permitted to use the service when the reference code matches the user code.

17. User equipment for using a service, the user equipment comprising:
a hardware storage configured to store personalization management information comprising a plurality of pieces of personalization information stored sequentially in the hardware storage, and a plurality of pieces of service operator information stored sequentially in the hardware storage corresponding to each of the plurality of pieces of personalization information;
a smart card configured to store user information about a user; and
at least one memory configured to store computer program code, and at least one central processing unit (CPU) configured to access the at least one memory and operate according to the computer program code, the computer program code including:
personalization code configured to cause at least one of the at least one CPU to receive an activated personalization category and a pre-set service operator, read the personalization management information from the hardware storage and sequentially search through the personalization management information to detect a match between a piece of plurality of pieces of personalization information and the activated personalization category, and search through the personalization management information to detect a match between the pre-set service operator and a piece of the plurality of pieces of service operator information, and determine whether the user is able to use the service, by using a result of the detection and the user information.

18. The user equipment of claim 17, wherein each piece of the plurality of pieces of personalization information comprises:
a personalization tag indicating a personalization category;
value data indicating the service operator information corresponding to the personalization category; and
length data of the piece of the personalization information.

19. The user equipment of claim 18, each piece of the plurality of pieces of service operator information comprises:
an operator tag indicating a type of the service operator;
operator value data corresponding to the type of the service operator; and
length data of the piece of the service operator information.

20. The user equipment of claim 19, wherein the personalization code is configured to cause the at least one of the at least one CPU to sequentially search through the plurality of pieces of personalization information using the length data of the plurality of pieces of the personalization information, and sequentially search through the plurality of pieces of service operator information using the length data of the plurality of pieces of the service operator information.

* * * * *